(12) United States Patent
Yabuki et al.

(10) Patent No.: US 11,117,048 B2
(45) Date of Patent: Sep. 14, 2021

(54) VIDEO GAME WITH LINKED SEQUENTIAL TOUCH INPUTS

(71) Applicant: NINTENDO CO., LTD., Kyoto (JP)

(72) Inventors: Kosuke Yabuki, Kyoto (JP); Takeshi Miyamoto, Kyoto (JP); Shigeto Murata, Tokyo (JP); Shinya Nakano, Tokyo (JP)

(73) Assignee: Nintendo Co., Ltd., Kyoto (JP)

( * ) Notice: Subject to any disclaimer, the term of this patent is extended or adjusted under 35 U.S.C. 154(b) by 42 days.

(21) Appl. No.: 16/688,156

(22) Filed: Nov. 19, 2019

(65) Prior Publication Data

US 2020/0086209 A1 Mar. 19, 2020

Related U.S. Application Data

(63) Continuation of application No. PCT/JP2017/019056, filed on May 22, 2017.

(51) Int. Cl.
*A63F 13/2145* (2014.01)
*A63F 13/837* (2014.01)
(Continued)

(52) U.S. Cl.
CPC ........ *A63F 13/2145* (2014.09); *A63F 13/426* (2014.09); *G06F 3/038* (2013.01)

(58) Field of Classification Search
CPC .... A63F 13/2145; A63F 13/42; A63F 13/426; A63F 13/573; A63F 13/803; A63F 13/92;
(Continued)

(56) References Cited

U.S. PATENT DOCUMENTS 7,309,287 B2   12/2007   Miyamoto
7,578,742 B2   8/2009   Miyamoto
(Continued)

FOREIGN PATENT DOCUMENTS

CN   105872664 A   8/2016
EP   1 852 163 A2   11/2007
(Continued)

OTHER PUBLICATIONS

International Search Report issued in PCT/JP2017/019056, dated Aug. 1, 2017, 4 pages.
(Continued)

*Primary Examiner* — Lawrence S Galka
(74) *Attorney, Agent, or Firm* — Nixon & Vanderhye PC

(57) ABSTRACT

An example of an information processing apparatus repeatedly acquires input positions detected by a pointing device. The information processing apparatus executes a first process on a first object in a virtual game space in response to a second input which is performed after end of a first input to the pointing device and within a first time period from the first input. The information processing apparatus sets a reference position, based on an input position at which the second input to the pointing device is started. The information processing apparatus executes a first movement process for causing the first object to move in the virtual game space, based on the reference position and on the input position of the second input which is continuously performed from start of the second input to the pointing device.

19 Claims, 17 Drawing Sheets

(51) Int. Cl.
*G06F 3/041* (2006.01)
*A63F 13/426* (2014.01)
*G06F 3/038* (2013.01)

(58) Field of Classification Search
CPC ........ A63F 2300/204; A63F 2300/1075; A63F 2300/6045; G07F 17/3209; G07F 17/322
See application file for complete search history.

(56) References Cited

U.S. PATENT DOCUMENTS

| | | |
|---|---|---|
| 8,172,681 B2 | 5/2012 | Kando |
| 8,197,342 B2 | 6/2012 | Kijima |
| 8,608,561 B2 | 12/2013 | Yamada |
| 9,649,563 B2 | 5/2017 | Lee |
| 10,335,678 B2 | 7/2019 | Takahashi |
| 10,585,531 B2 | 3/2020 | Ikeda |
| 2006/0019752 A1 | 1/2006 | Ohta |
| 2006/0052166 A1 | 3/2006 | Ohta |
| 2006/0109259 A1 | 5/2006 | Ohta |
| 2006/0128468 A1 | 6/2006 | Yoshikawa |
| 2007/0075985 A1 | 4/2007 | Niida |
| 2009/0143141 A1 | 6/2009 | Wells |
| 2012/0302338 A1 | 11/2012 | Shikata |
| 2012/0302345 A1 | 11/2012 | Shikata |
| 2012/0306775 A1* | 12/2012 | Miyachi .............. G06F 3/03545 345/173 |
| 2013/0084980 A1 | 4/2013 | Hammontree et al. |
| 2013/0154974 A1 | 6/2013 | Murata |
| 2013/0190085 A1 | 7/2013 | Yoshikawa et al. |
| 2014/0256439 A1 | 9/2014 | Wang et al. |
| 2014/0340329 A1 | 11/2014 | Chen |
| 2015/0094127 A1* | 4/2015 | Canose ............... G06F 3/04842 463/2 |
| 2015/0157932 A1 | 6/2015 | Kwon |

FOREIGN PATENT DOCUMENTS

| | | |
|---|---|---|
| EP | 2 422 854 A2 | 2/2012 |
| JP | H11-95650 | 4/1999 |
| JP | 2002-000939 | 1/2002 |
| JP | 3734819 | 10/2005 |
| JP | 3734820 | 10/2005 |
| JP | 2012-252587 | 12/2012 |
| JP | 2013-127683 | 6/2013 |
| JP | 2016-120131 | 7/2016 |
| JP | 2016-134052 | 7/2016 |
| JP | 6097427 | 3/2017 |
| KR | 10-2011-0119227 | 11/2011 |

OTHER PUBLICATIONS

Toshiaki Yasuda, "E3 2012, GREE Shutten Booth Report 'Metal Slug', 'Biohazard' Nado Shinsaku Title o Ikkyo ni Taiken", 'Wacky Mortors', [online], Jun. 8, 2012, Impress Corp., GAME Watch, [retrieval data Jul. 19, 2017], Internet URL:http://game.watch.impress.co.jp/docs/news/538861.html (6 pages).
Mario Kart DS Kanpeki Bakuso Guidebook, 1st edition, Enterbrain, Inc., Jan. 24, 2006, p. 26 (4 pages).
Extended European Search Report dated Oct. 5, 2020 issued in European Application No. 17910718.0 (11 pgs.).
Extended European Search Report dated Dec. 20, 2019 issued in European Application No. 17905006.7 (10 pgs.).
Office Action dated Jan. 6, 2021 issued in U.S. Appl. No. 16/689,496 (10 pgs.).
U.S. Appl. No. 16/686,688 to Yabuki, et al., filed Nov. 18, 2019 (74 pages).
U.S. Appl. No. 16/689,496 to Yabuki, et al., filed Nov. 20, 2019 (77 pages).
U.S. Appl. No. 16/686,688, filed Nov. 18, 2019, Storage Medium Storing Game Program, Information Processing Apparatus, Information Processing System, and Game Processing Method.
U.S. Appl. No. 16/688,156, filed Nov. 19, 2019, Storage Medium Storing Game Program, Information Processing Apparatus, Information Processing System, and Game Processing Method.
U.S. Appl. No. 16/689,496, filed Nov. 20, 2019, Storage Medium Storing Game Program, Information Processing Apparatus, Information Processing System, and Game Processing Method.
Extended European Search Report dated Jan. 10, 2020 issued in European Application No. 17905004.2 (9 pgs.).
Notice of Reasons for Refusal dated Jul. 8, 2021 in corresponding Japanese Application No. 2019-519822, 5 pages.

* cited by examiner

VIDEO GAME WITH LINKED SEQUENTIAL TOUCH INPUTS

CROSS REFERENCE TO RELATED APPLICATION

The present application is a continuation application of International Patent Application PCT/JP2017/019056 filed on May 22, 2017, the entire contents of which is incorporated herein by reference.

FIELD

The present technology relates to a storage medium storing a game program, a game apparatus, a game system, and a game processing method, which use a pointing device to perform an input.

BACKGROUND AND SUMMARY

Conventionally, a technique of performing game operations by using a pointing device such as a touch panel has been proposed. For example, a game operation of causing an object in a game space to move is performed by using a pointing device.

A user interface which enables a user to perform more various game operations by using a pointing device has been desired.

Therefore, the present application discloses a storage medium storing a game program, a game apparatus, a game system, and a game processing method, which enable a user to perform various game operations by using a pointing device.

(1)

An example of a storage medium described herein stores a game program which causes a computer of an information processing apparatus to execute an acquisition step, a first process execution step, a first reference position setting step, and a first movement process step. In the acquisition step, the computer repeatedly acquires input positions detected by a pointing device. In the first process execution step, the computer executes a first process on a first object in a virtual game space in response to a second input which is performed after end of a first input to the pointing device and within a first time period from the first input. In the first reference position setting step, the computer sets a reference position, based on an input position at which the second input to the pointing device is started. In the first movement process step, the computer executes a first movement process for causing the first object to move in the virtual game space, based on the reference position and on the input position of the second input which is continuously performed from start of the second input to the pointing device.

According to the configuration of above (1), the user can execute two types of processes on the object by a set of input operations, i.e., the first input and the second input. Therefore, the information processing apparatus allows the user to perform various game operations by the inputs to the pointing device.

(2)

In the first process execution step, the first process may be executed at least on a condition that a time period from a timing based on start or end of the first input to a timing at which the second input is started is within the first time period.

According to the configuration of above (2), the information processing apparatus can appropriately calculate the time period from the first input to the second input, and therefore can accurately determine whether or not to execute the first process.

(3)

In the first process execution step, the first process may be executed at least on a condition that a distance between a position at which the first input is performed and a position at which the second input is performed is equal to or less than a predetermined value.

According to the configuration of above (3), when the position at which the first input is performed and the position at which the second input is performed are away from each other, the information processing apparatus may not execute the first process. Thus, it is possible to reduce a risk that the first process is executed due to an erroneous input by the user.

(4)

The game program may further cause the computer to execute a second process execution step. In the second process execution step, the computer executes a second process on the first object, the second process being different from the first process, in the case where the second input which is continuously performed from the start of the second input satisfies a predetermined condition.

According to the configuration of above (4), the user can cause the information processing apparatus to execute the second process in addition to the first process and the first movement process, by the second input. That is, the information processing apparatus allows the user to perform more various game operations by the continuous second input.

(5)

The game program may further cause the computer to execute a second reference position setting step and a third process execution step. In the second reference position setting step, the computer sets a reference position, based on an input position regarding a third input to the pointing device, the third input being different from the second input. In the third process execution step, the computer executes a third process on a second object which is the same as or different from the first object, the third process being different from the first movement process, based on the reference position and on the input position of the third input which is continuously performed from start of the third input.

According to the configuration of above (5), the information processing apparatus allows the user to perform operations on the object also by the third input different from the second input, and therefore allows the user to perform more various game operations.

(6)

The second object may be the same as the first object. In the third process execution step, a process for causing the second object to move by a control method different from that for the first movement process may be executed as the third process.

According to the configuration of above (6), the user can perform the movement operations on the object by the second input performed after the first input, and by the third input different from the second input. That is, the user can properly use the two types of movement operations by the simple method that depends on whether or not to perform the first input. That is, the information processing apparatus can provide a user interface with good operability, which enables the user to easily use the two types of movement operations.

(7)

The game program may further cause the computer to execute a determination step. In the determination step, the computer determines whether or not an input time period from start to end of an input, to the pointing device, which is different from the second input, is within a predetermined second time period. In the first process execution step, an input whose input time period is determined to be within the second time period may be regarded as the first input, and the first process may be executed in response to the second input performed after the first input. In the third process execution step, the third process may be executed, with an input whose input time period is determined not to be within the second time period being regarded as the third input.

According to the configuration of above (7), the information processing apparatus can easily distinguish between the first input and the third input by determining whether or not the input time period is within the second time period.

(8)

The game program may further cause the computer to execute a fourth process execution step. In the fourth process execution step, the computer executes a fourth process for causing the first object to perform a predetermined action in response to the first input.

According to the configuration of above (8), the user can cause the object to perform a predetermined action also by the first input. That is, the information processing apparatus allows the user to perform more various game operations.

This specification discloses examples of an information processing apparatus and an information processing system which executes the processes in the steps in above (1) to (8) (not limited to the mode of executing the steps by a program). In addition, this specification discloses an example of a game processing method in which a computer executes the processes in the steps in above (1) to (8).

With the storage medium storing, the game apparatus, the game system, and the game processing method described above, various game operations can be performed by using a pointing device.

These and other objects, features, aspects and advantages will become more apparent from the following detailed description when taken in conjunction with the accompanying drawings.

DETAILED DESCRIPTION OF NON-LIMITING EXAMPLE EMBODIMENTS

[1. Overall Configuration of System]

Figure 1:
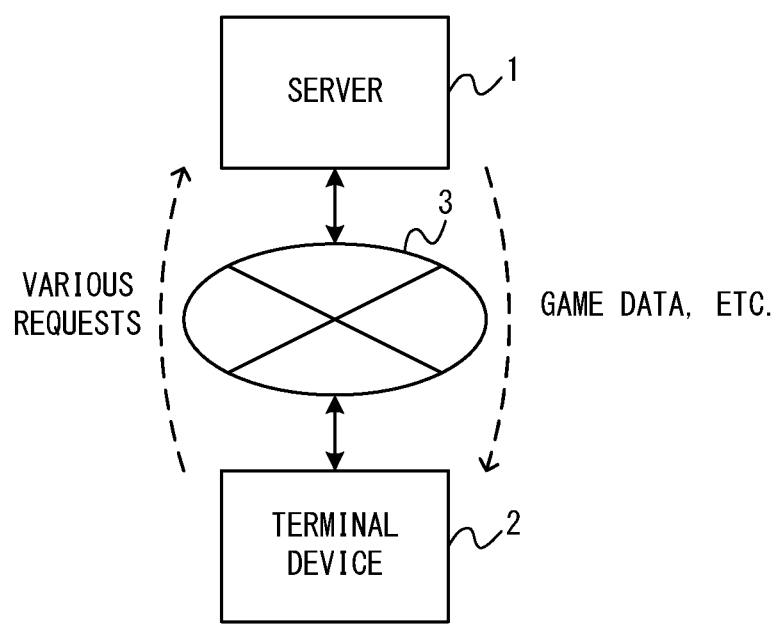
FIG. 1 is a block diagram showing an example of a configuration of a non-limiting information processing system according to an embodiment.

Hereinafter, an information processing system, an information processing apparatus, a game program, and a game processing method according to the present embodiment will be described. First, a description is given of the overall configuration of the information processing system according to the present embodiment, and the configurations of a terminal device and a server included in the information processing system. FIG. 1 is a block diagram showing an example of the configuration of the information processing system according to the present embodiment. As shown in FIG. 1, the information processing system includes a server 1 and a terminal device 2. The server 1 and the terminal device 2 are connectable to a network 3 such as the Internet and/or a mobile communication network. The server 1 and the terminal device 2 are communicable with each other via the network 3.

The server 1 is a server for providing services relating to applications to be executed in the terminal device 2. In the present embodiment, the server 1 is a game server for games to be executed in the terminal device 2. That is, the server 1 provides an environment for execution of game processing in the terminal device 2. For example, in response to a request from the terminal device 2 which executes game processing, the server 1 executes the game processing according to need, and transmits, to the terminal device 2, game data complying with the request.

The terminal device 2 is an example of an information processing apparatus possessed by a user. Examples of the terminal device 2 include: a smart phone, a hand-held or stationary game apparatus, a mobile phone, a tablet terminal, and a wearable terminal. The terminal device 2 can execute a game program (in other words, game application) for which the server 1 provides a service.

(Specific Example of Configuration of Server 1)

Figure 2:
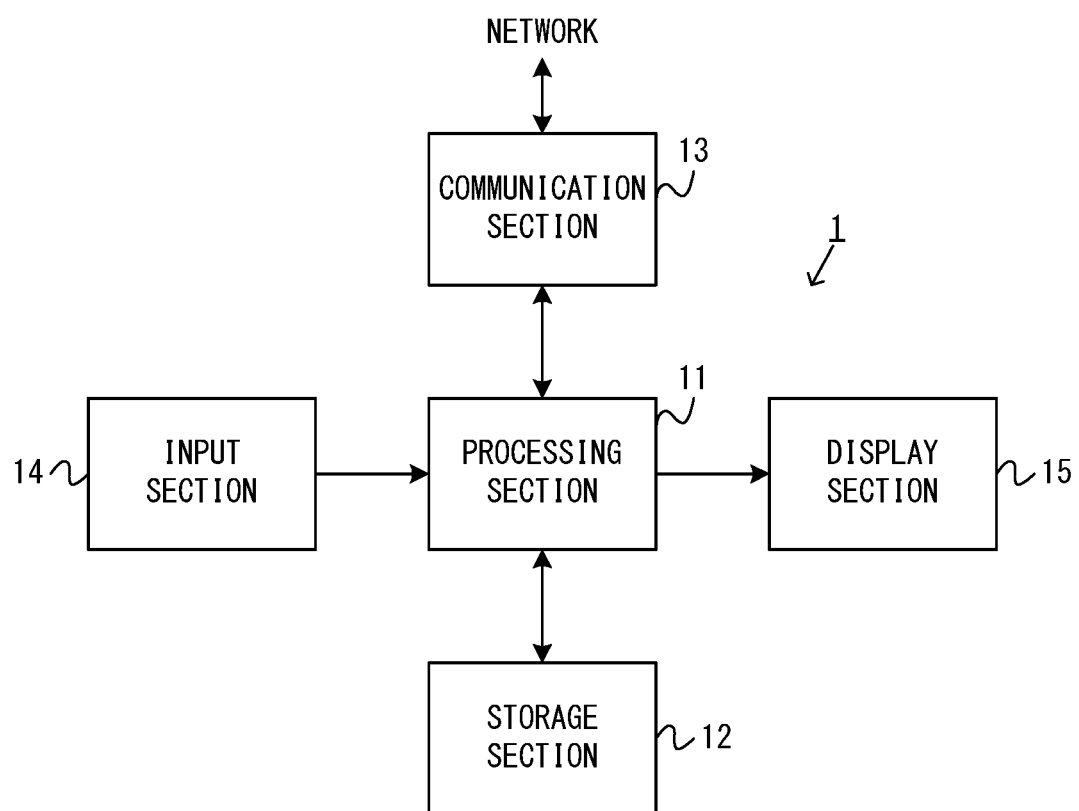
FIG. 2 is a block diagram showing an example of a configuration of a non-limiting server.

FIG. 2 is a block diagram showing an example of a configuration of the server 1. In FIG. 2, each of components of the server 1 is implemented by one or more information processing apparatuses. The hardware configuration of the server 1 of the present embodiment may be the same as that for a conventional server.

As shown in FIG. 2, the server 1 includes a processing section 11 and a storage section 12. The processing section 11 is electrically connected to the components 12 to 15 of the server 1. The processing section 11 includes a CPU (Central Processing Unit) and a memory. In the server 1, the CPU executes, using the memory, programs stored in the storage section 12, thereby executing various kinds of information processing. The storage section 12 is any storage device (also referred to as "storage medium") that is accessible by the processing section 11. The storage section 12 stores therein programs to be executed in the processing section 11, data to be used for information processing by the processing section 11, data obtained by the information processing, etc. In the present embodiment, the storage section 12 stores therein at least a program for game processing which is to be executed on the server side for game processing to be executed in the terminal device 2.

The server 1 includes a communication section 13. The communication section 13 is connected to the network 3, and has a function of communicating with other devices (e.g., the terminal device 2) via the network 3. The server 1 includes an input section 14 and a display section 15 as input/output interfaces.

(Specific Example of Configuration of Terminal Device 2)

Figure 3:
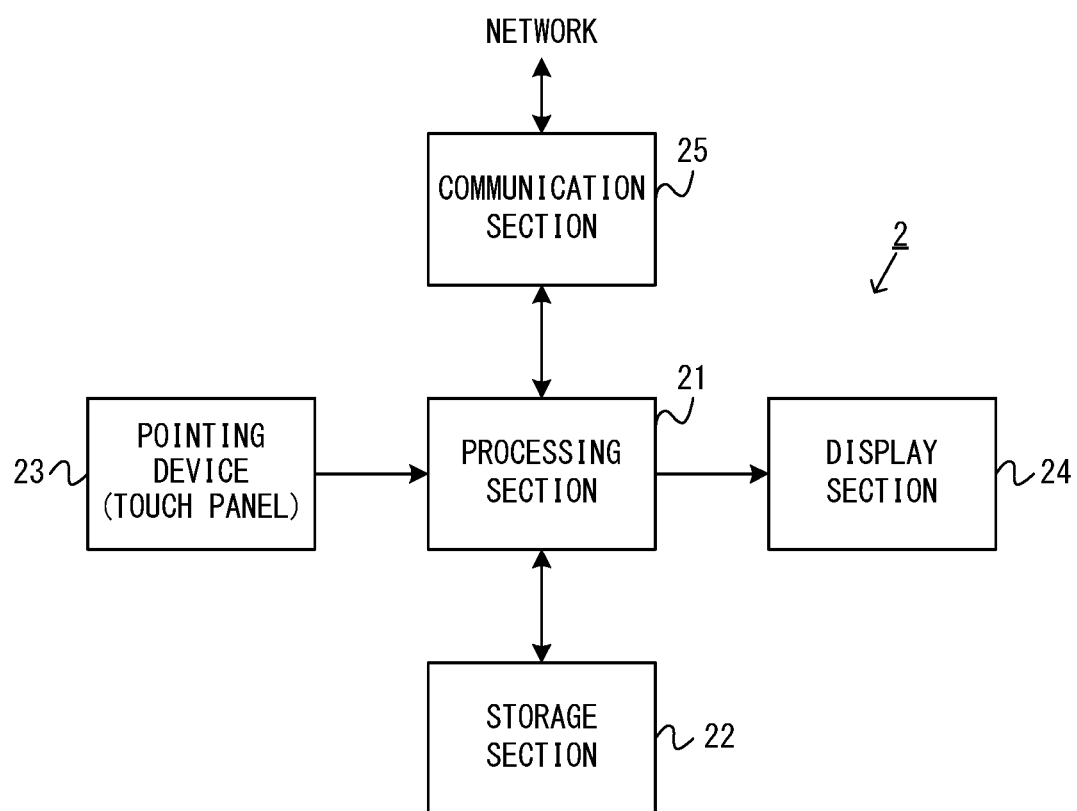
FIG. 3 is a block diagram showing an example of a configuration of a non-limiting terminal device.

FIG. 3 is a block diagram showing an example of a configuration of the terminal device 2. As shown in FIG. 3, the terminal device 2 includes a processing section 21 and a storage section 22. The processing section 21 is electrically connected to the components 22 to 25 of the terminal device 2. The processing section 21 includes a CPU and a memory. In the terminal device 2, the CPU executes, using the memory, programs (including the aforementioned game program) stored in the storage section 22, thereby executing various kinds of information processing. The storage section 22 stores therein programs to be executed in the processing section 21, data to be used for information processing by the processing section 21, and data obtained by the information processing, etc. The storage section 22 may be a storage medium (e.g., a card-type storage medium) that is attachable/detachable with respect to the terminal device 2.

The terminal device 2 includes a pointing device as an example of the input section. The pointing device is any input device having an input surface, and is capable of detecting a position designated on the input surface (by a user, for example). In the present embodiment, the pointing device is a touch panel 23 provided on a screen of a display section 24. The touch panel 23 detects a position designated by an input of touching (referred to as "touch input") on the input surface (in other words, a surface set on the screen of the display section 24).

The pointing device may be a touch type input device capable of detecting a position designated (by the user, for example) on an input surface, such as a touch screen, a touch panel, or a touch pad. The touch type input device may be an input device that allows contact or noncontact input to an input surface. That is, the touch type input device is not limited to a device capable of detecting a position of a touch input to the input surface, and may be an input device (e.g., an input device having a floating touch function) capable of detecting an input position by detecting a finger or the like disposed at a position a little distant from the input surface. That is, the touch type input device may detect a position designated by an input performed by disposing a finger or the like at a position a little distant from the input surface, instead of (or in addition to) a touch input performed on the input surface.

The pointing device is not limited to the touch type input device, and may be a mouse, or an operation apparatus that is moved by a user. The operation apparatus is able to designate a position on an input surface in accordance with the position and/or the direction of the operation device.

As in a touch panel, for example, when the input surface of the pointing device is set on the screen of the display section 24, an input position detected by the pointing device is, to be precise, a position corresponding to a position on the display screen. However, the input position substantially indicates a position on the display screen. Therefore, in the description of the present embodiment, for easy understanding, the input position is sometimes described as a position on the display screen. The wording "an input position is located at a specific position on the display screen" means, to be precise, that the input position is located at a position that is on the input surface and corresponds to a specific position on the display screen.

The terminal device 2 includes a display section 24. The display section 24 displays an image (e.g., a game image, etc.) generated by information processing executed in the processing section 21 of the terminal device 2.

The terminal device 2 includes a communication section 25. In the present embodiment, the communication section 25 has a function of performing communication while being connected to a mobile communication network (in other words, mobile telephone communication network). That is, the terminal device 2 (specifically, the processing section 21) is connected to the network 3 by using the communication section 25 (in other words, through the communication section 25) via the mobile communication network, and communicates with other devices (e.g., the server 1, etc.). The configuration of the communication section, through which the terminal device 2 performs communication via the network 3, is arbitrary. For example, the communication section 25 may have a function of connecting to a wireless LAN through a communication module with Wi-Fi authentication. Alternatively, the communication section 25 may have both a function of connecting to a mobile communication network and a function of connecting to a wireless LAN.

[2. Outline of Processing in Information Processing System]

Hereinafter, an outline of game processing executed in the information processing system will be described with reference to FIGS. 4 to 13. In the present embodiment, an exemplary case will be described, where game processing for a racing game in which a user (in other words, a player) operates an object representing a car (refer to FIG. 4) is executed in the information processing system.

In the present embodiment, the user performs an operation on the object by a touch input to the touch panel 23. That is, the terminal device 2 controls action (more specifically, movement) of the object, based on a touch input to the touch panel 23.

[2-1. Action when No Touch Input is Performed]

Figure 4:
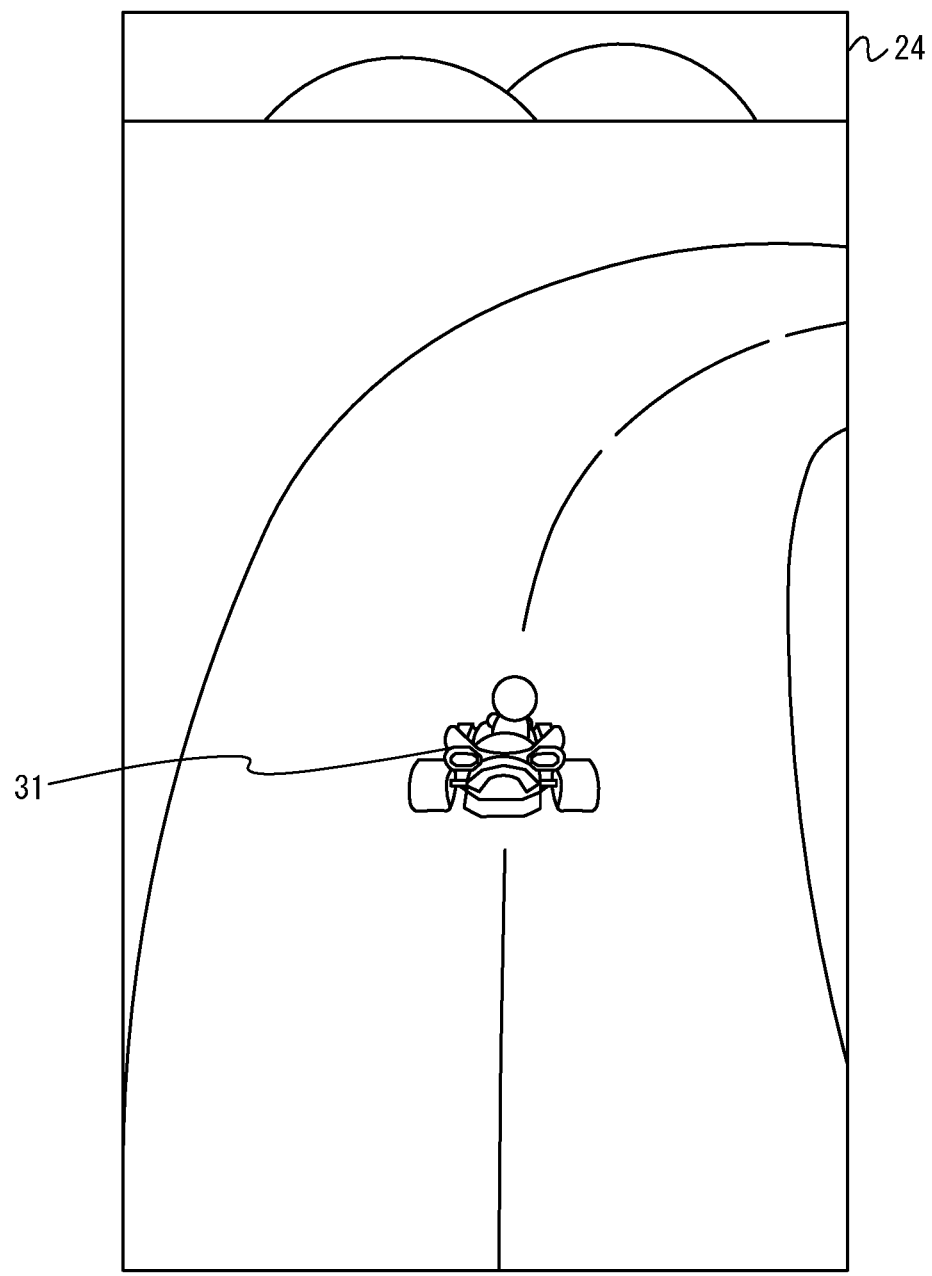
FIG. 4 shows an example of a game image.

First, an action in the case where no touch input is performed will be described. FIG. 4 shows an example of a game image. FIG. 4 shows a game image when no touch input is performed. As shown in FIG. 4, the terminal device 2 causes the display section 24 to display a game image including a virtual game space (in the present embodiment, a racing course), and an object 31 which appears in the game space. The object 31 is an object representing a car (and a character driving the car), and is operated by the user.

In the present embodiment, when no touch input is performed, the terminal device 2 controls movement of the object 31 automatically (i.e., according to a predetermined algorism). In this case, the object 31 is automatically controlled so as to advance along the racing course. In another embodiment, the terminal device 2 may control movement of the object 31 such that the object 31 advances straight, when no touch input is performed.

In the present embodiment, the speed of the object 31 is controlled automatically (e.g., at a fixed speed), except when an acceleration action described later is performed. In another embodiment, the speed of the object 31 may be controlled based on an input performed by the user. For example, the terminal device 2 may control the speed of the object 31, based on an instruction from the user (e.g., an instruction by a touch input to an accelerator button displayed on a screen).

In the present embodiment, the object 31 can take two types of states, i.e., a normal state and a drift state. Although details will be described later, the normal state and the drift state are different from each other in the content of a process of controlling movement of the object 31 based on a touch input by the user. In the present embodiment, the object 31 is in the normal state at least when no touch input is performed.

[2-2. Action when Touch Input is Performed]

In the present embodiment, the user performs a movement operation on the object 31 by a touch input. In the present embodiment, the user adopts: an operation method (FIG. 5) of simply performing a movement operation (i.e., without performing a tap operation described later); and an operation method (FIG. 9) of performing a movement operation subsequently to the tap operation. In the following description, the movement operation that is performed without performing the tap operation is referred to as "first movement operation", and the movement operation that is performed subsequently to the tap operation is referred to as "second movement operation". When the first movement operation is performed, the terminal device 2 performs movement control for the object 31 in the aforementioned normal state. When the second movement operation is performed, the terminal device 2 performs movement control for the object 31 in the aforementioned drift state. Thus, in the present embodiment, the user can properly use the two types of movement operations, depending on whether or not to perform the tap operation before the movement operation. Hereinafter, the movement operations will be described in detail.

[2-2-1. First Movement Operation]

Figure 5:
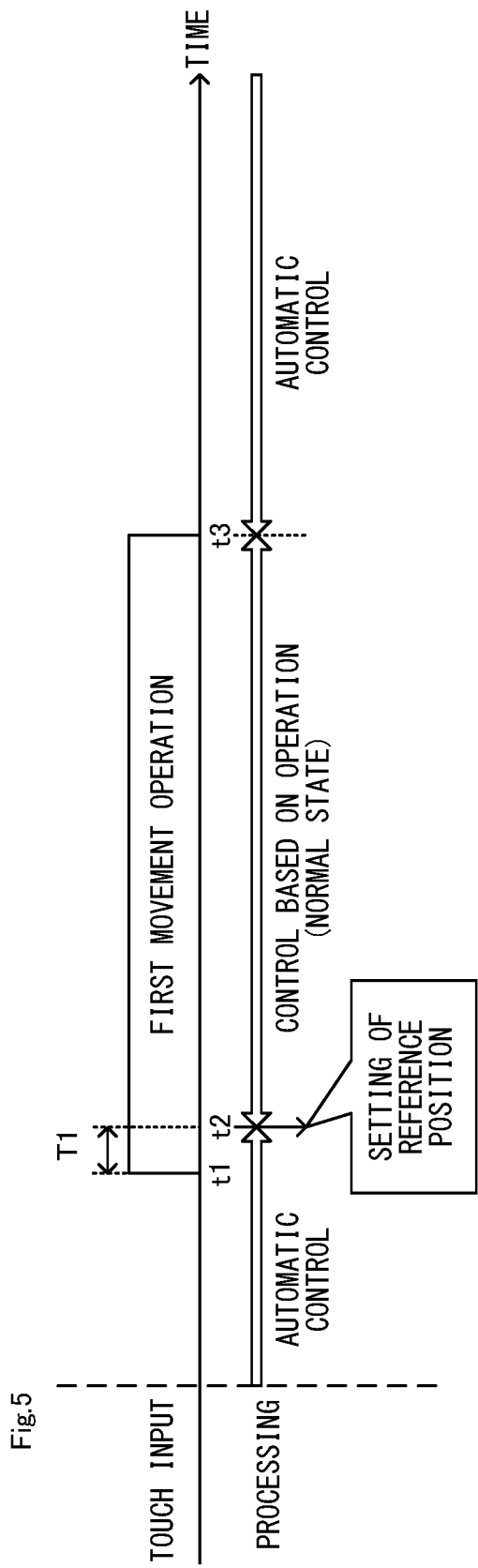
FIG. 5 shows an example of a first movement operation according to the embodiment.

FIG. 5 shows an example of the first movement operation according to the present embodiment. In FIG. 5 (also in FIGS. 9 and 17), a touch input to be performed is shown above the time axis, and processes to be executed in the terminal device 2 are shown beneath the time axis.

As shown in FIG. 5, the first movement operation is an operation of performing a touch input continuously from start of the touch input (specifically, a sliding operation). Hereinafter, a touch input which is continuously performed from a touch-on (i.e., which is performed without interruption from a touch-on) is referred to as "continuous touch input". In this specification, "touch-on" means that a touch input is started. In other words, "touch-on" means a change from a state where no touch input is performed to a state where a touch input is performed. In this specification, end of a touch input, in other words, a change from a state where a touch input is performed to a state where no touch input is performed, is referred to as "touch-off". Although details will be described later, the user appropriately shifts an input position during a continuous touch input in the movement operation, to designate the content (an input direction and an input distance described later) of an input instruction.

In the example of FIG. 5, the user starts a touch input at a time point corresponding to timing t1. Thereafter, if the touch input is continuously performed even after a predetermined time period T1 has passed from the start of the touch input, the terminal device 2 determines that the first movement operation is performed (in other words, the operation by the touch input is the first movement operation). If the continuous touch input is ended before the predetermined time period T1 passes from the start of the touch input, the terminal device 2 determines that the tap operation is performed (in other words, the operation by this touch input is the tap operation). Thus, in the present embodiment, the terminal device 2 determines whether or not the time period from the touch-on regarding the continuous touch input has exceeded the time period T1, for the purpose of determining whether the operation by the started touch input is the first movement operation or the tap operation.

Upon determining that the first movement operation is performed, the terminal device 2 sets a reference position (refer to FIG. 5). Although details will be described later, the reference position is a position used for specifying the content of an input instruction by the touch input. In the present embodiment, the terminal device 2 sets a reference position, based on an input position at the time point when the first movement operation is determined to be performed (in the example of FIG. 5, timing t2). More specifically, an input position, at the time point when the first movement operation is determined to be performed, is set as a reference position.

In another embodiment, a reference position may be any position that is set based on an input position at the time when the reference position is set. For example, in the case where an input position at the time of setting a reference position is located near an end of the screen of the display section 24, the terminal device 2 may set, as a reference position, a position at a predetermined distance from the end of the screen, based on the input position. This allows, in the above case, the user to designate an input position that is by the predetermined distance away from the reference position in any direction. Alternatively, in the above case, a reference position may be set at a position at a distance of a radius r2 of a reference position image described later from the end of the screen.

In another embodiment, a reference position may be set at a position that is independent of an input position at the time when the reference position is set. For example, the terminal device 2 may set, as a reference position, an input position at the time of a touch-on in the first movement operation. Alternatively, the terminal device 2 may set, as a reference position, a predetermined position (e.g., a center position of the screen of the display section 24).

In the present embodiment, the user can start a touch input for the movement operation, with any position on the input surface of the touch panel 23 being an input start position. That is, in response to that a touch input is started at any position on the input surface, the terminal device 2 executes processing (refer to FIGS. 15 and 16) regarding the movement operation. However, in another embodiment, the terminal device 2 may execute the above processing on condition that a touch input is started within a predetermined input reception area in the input surface. The input reception area may be, for example, an area that is set based on the position of the object 31, or a predetermined area.

Figure 6:
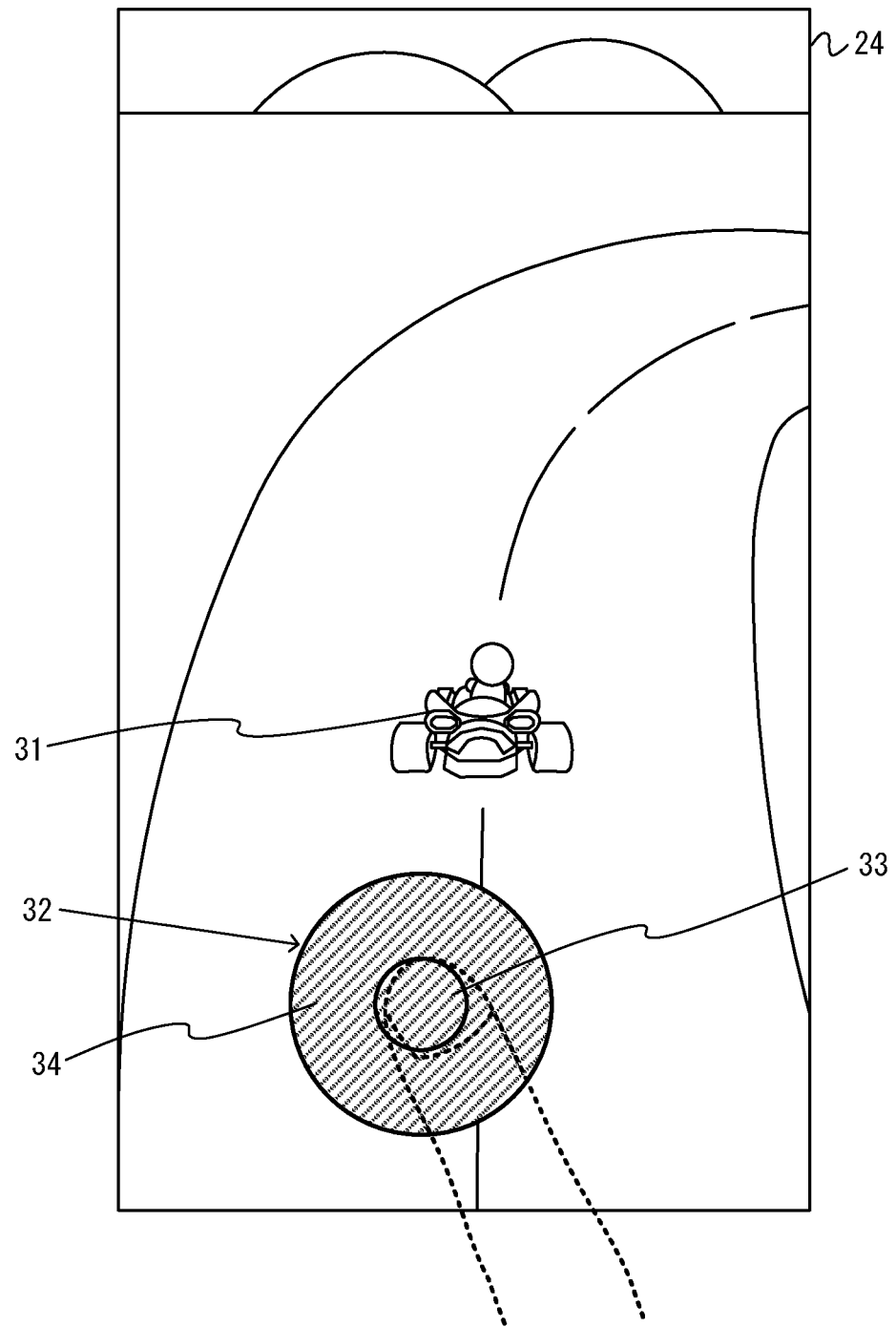
FIG. 6 shows an example of a game image after a touch input is started.

FIG. 6 shows an example of a game image after a touch input is started. As shown in FIG. 6, while the user performs the movement operation, the terminal device 2 causes the display section 24 to display an operation image 32 in addition to the game image. In FIG. 6, a finger of the user who performs the touch input is represented by a dotted line. In the present embodiment, the operation image 32 includes an input position image 33 and a reference position image 34.

The input position image 33 is an image representing a position that is located on the input surface of the touch panel 23 and is the current input position. Specifically, the input position image 33 represents a circular region having a radius r1 around the input position (refer to FIG. 7). The reference position image 34 is an image representing a position that is located on the input surface of the touch panel 23 and is a reference position. Specifically, the reference position image 34 represents a circular region having a radius r2 (>r1) around the reference position (refer to FIG. 7).

As described above, in the present embodiment, since the operation image 32 is displayed, the user can visually recognize the input position and the reference position. This allows the user to easily perform an input according to his/her intention, and the terminal device 2 can improve operability for the touch input. As shown in FIG. 6, the operation image 32 of the present embodiment is an image representing a slide pad that is an example of a direction input device. However, in another embodiment, the operation image 32 may be any image representing a reference position and an input position. In still another embodiment, no operation image 32 may be displayed on the display section 24.

In the present embodiment, the user performs an input instruction to instruct a movement direction of the object 31 by the first movement operation. Hereinafter, a method for performing an input instruction will be described with reference to FIG. 7.

Figure 7:
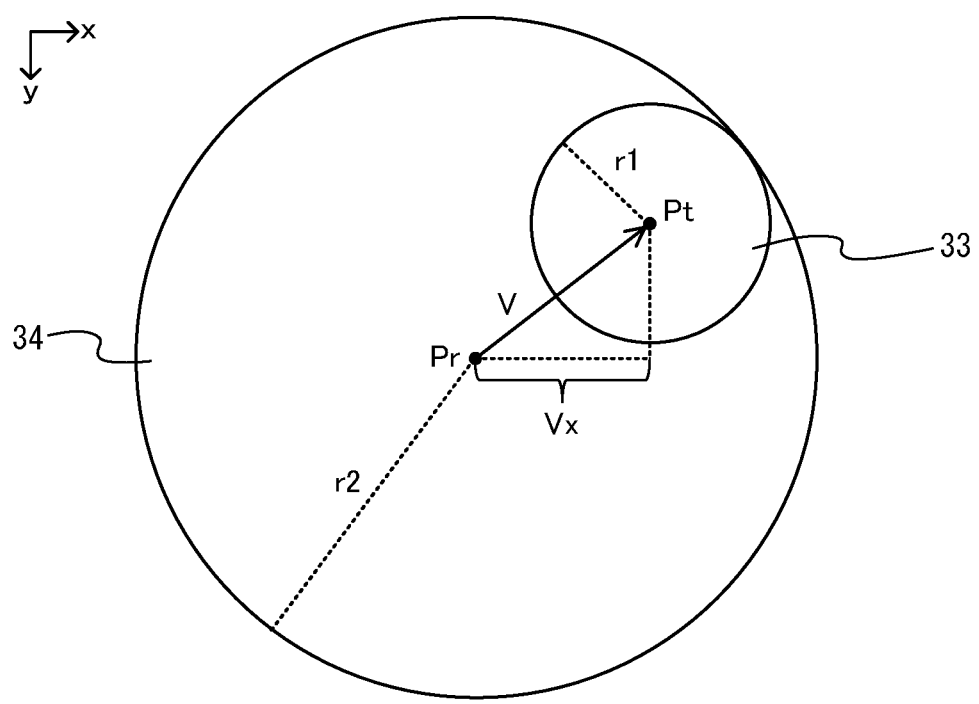
FIG. 7 shows an example of an operation image.

FIG. 7 shows an example of an operation image. In FIG. 7, a reference position and an input position are shown in addition to an operation image 32 displayed on the display section 24. In the present embodiment, the input position is acquired, from the touch panel 23, as two-dimensional coordinates indicating a position on the input surface. In addition, each of the input position and the reference position is stored as two-dimensional coordinates in the terminal device 2.

FIG. 7 shows a state where, after a reference position Pr has been set, an input position Pt is shifted from an input position at the time of setting the reference position (i.e., from the reference position Pr). An input instruction by a touch input is performed during a time period in which the touch input is continued from a touch-on, after the reference position has been set (in the example of FIG. 5, a time period from timing t2 to timing t3 of a touch-off). During this period, the terminal device 2 specifies the content of the input instruction, based on the reference position and the input position. In the present embodiment, as values representing the content of the input instruction, an input direction and an input distance are calculated.

The input direction is calculated based on a vector V from the reference position Pr to the input position Pt. The vector V is a vector having the reference position Pr as a start point, and the input position Pt as an end point. In the present embodiment, the input direction is calculated as a direction of an x-axis component of the vector V (in other words, a component in a transverse direction on the input surface). That is, in the present embodiment, the input direction is calculated as a rightward direction (i.e., x-axis positive direction) or a leftward direction (i.e., x-axis negative direction).

The input distance is calculated based on the magnitude of the vector V. In the present embodiment, the input distance is calculated as a magnitude Vx of the x-axis component of the vector V.

As described above, in the present embodiment, an input instruction corresponds to a direction and a magnitude regarding a one-dimensional direction (specifically, x-axis direction). Therefore, an input instruction may be represented as a numerical value, such as "−2" or "1", in which an input direction is represented as a positive or negative sign and an input distance is represented as an absolute value.

In another embodiment, an input instruction may be a direction and a magnitude regarding a two dimension. That is, an input instruction may have the direction of the vector V being an input direction, and the magnitude of the vector V being an input distance. In still another embodiment, an input instruction may include only one of an input direction and an input distance.

The terminal device 2 controls action (specifically, movement) of the object 31, based on the aforementioned input instruction. In other words, the object 31 is controlled based on the input position and the reference position. A specific control method for the object 31 is arbitrary. In the present embodiment, the terminal device 2 controls the object 31 such that the object 31 makes a turn by an amount of turn according to the input distance, in a direction according to the input direction. That is, the object 31 moves so as to make a longer turn to the right as the input position Pt is more distant from the reference position Pr in the rightward direction, and moves so as to make a longer turn to the left as the input position Pt is more distant from the reference position Pr in the leftward direction. The direction and amount of turn of the object 31 may be calculated based on a straight advance direction, or may be calculated based on an advance direction of the object 31 when the object 31 automatically travels (i.e., when no touch input is performed). Furthermore, in the present embodiment, the speed of the object 31 during the movement operation is automatically controlled as described above.

As described above, in the present embodiment, the terminal device 2 controls movement of the object 31, based on an input distance that is a distance between a reference position and an input position continuously acquired after setting of the reference position, and on an input direction that is a direction from the reference position to the input position. According to this control, the user can perform an operation on an object by a simple operation method which is a touch input continued from a touch-on (i.e., continuous touch input). In another embodiment, movement of the object 31 may be controlled based on at least one of the input distance and the input direction.

The terminal device 2 may start control for the object 31 on condition that an input distance exceeds a predetermined control start distance. At this time, control for the object 31 is not performed during a time period from when an input is started to when an input position is adequately away from a reference position. Thus, it is possible to reduce a risk that movement control for the object 31 will be performed against the user's intention when, for example, the user accidentally performs a touch input without intending to perform movement operation (more specifically, for example, when a finger of the user hits the input surface of the touch panel 23).

(Reference Position Changing Process)

In the present embodiment, a reference position that has been set may be changed while a touch input continued from setting of the reference position is being performed. Hereinafter, a reference position changing process will be described.

Figure 8:
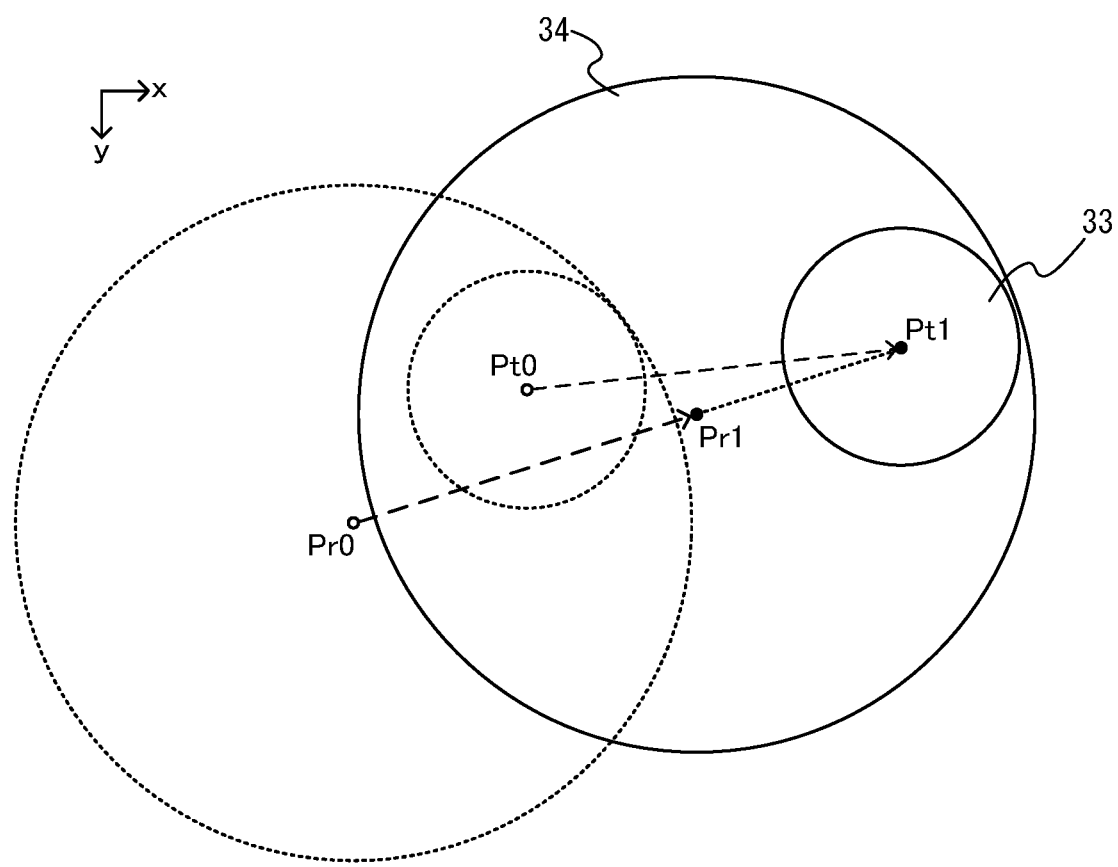
FIG. 8 shows an example of a state in which a reference position is changed.

FIG. 8 shows an example of a state in which a reference position is changed. In FIG. 8, a position Pr0 is a reference position at a certain time point t=0 during a continuous touch input, and a position Pt0 is an input position detected at the time point t=0. In the example of FIG. 8, an input position Pt1 is detected at a time point t=1 which is an input position detection time point subsequent to the time point t=0. In the present embodiment, the reference position is changed from the position Pr0 to a position Pr1 in response to the input position Pt1 being detected (refer to FIG. 8).

Specifically, when the distance from the reference position to the input position exceeds a predetermined distance as a result of shifting of the input position due to the continuous touch input, the terminal device 2 changes the reference position. The predetermined distance has a value determined in advance. For example, the predetermined distance has a value obtained by subtracting the radius r1 of the input position image from the radius r2 of the reference position image 34. Therefore, in the present embodiment, the reference position is set (in other words, changed) such that the input position image 33 is included in the reference position image 34. That is, the input position image 33 is disposed so as to be included in the circular region of the reference position image 34. In another embodiment, the reference position may be set such that the input position (i.e., the center of the input position image 33) is included in the reference position image 34. At this time, the aforementioned predetermined distance is set to the radius r2 of the reference position image 34. In another embodiment, the predetermined distance may be set to a value independent of the radius r1 of the input position image 33 and the radius r2 of the reference position image 34. That is, the sizes of the input position image 33 and the reference position image 34 may not be used for the reference position changing process.

As described above, the terminal device 2 changes the reference position such that the distance from the reference position to the input position is within the aforementioned predetermined distance. In the present embodiment, the post-change reference position Pr1 is determined to be a position on a line segment connecting the pre-change reference position Pr0 and the current input position Pt1, and the distance from the post-change reference position Pr1 to the current input position Pt1 is equal to the aforementioned predetermined distance (refer to FIG. 8).

A specific method for calculating a post-change reference position is arbitrary. For example, in another embodiment, the terminal device 2 may calculate a post-change reference position Pr1 such that the pre-change reference position Pr0 is shifted in a direction according the direction from the pre-change input position Pt0 of the reference position, to the current input position Pt1.

In the case where the reference position is changed as described above, the terminal device 2 calculates an input instruction (an input direction and an input distance) to be used for movement control of the object 31, based on the post-change reference position. The process of controlling the object 31 based on the input instruction is the same before and after the change of the reference position.

As described above, in the present embodiment, the terminal device 2 changes the reference position such that the reference position follows movement of the input position under certain conditions. Thus, the distance between the input position and the reference position is maintained within the aforementioned predetermined distance, which allows the user to easily perform an operation to move the current input position to the opposite side with respect to the reference position. For example, the user can easily change the input position on the right side with respect to the reference position, to a position on the left side with respect to the reference position. That is, the user can easily change an input instruction instructing the rightward direction to an input instruction instructing the leftward direction.

In another embodiment, the terminal device 2 may not execute the process of changing the reference position. That is, even when the distance from the input position to the reference position exceeds the aforementioned predetermined distance, the reference position may not be changed. At this time, the terminal device 2 may restrict the magnitude of the input distance (i.e., may set a maximum value of the input distance). That is, when the distance between the input position to the reference position exceeds the predetermined distance, the terminal device 2 may adopt the input distance as the predetermined distance.

[2-2-2. Second Movement Operation]

Figure 9:
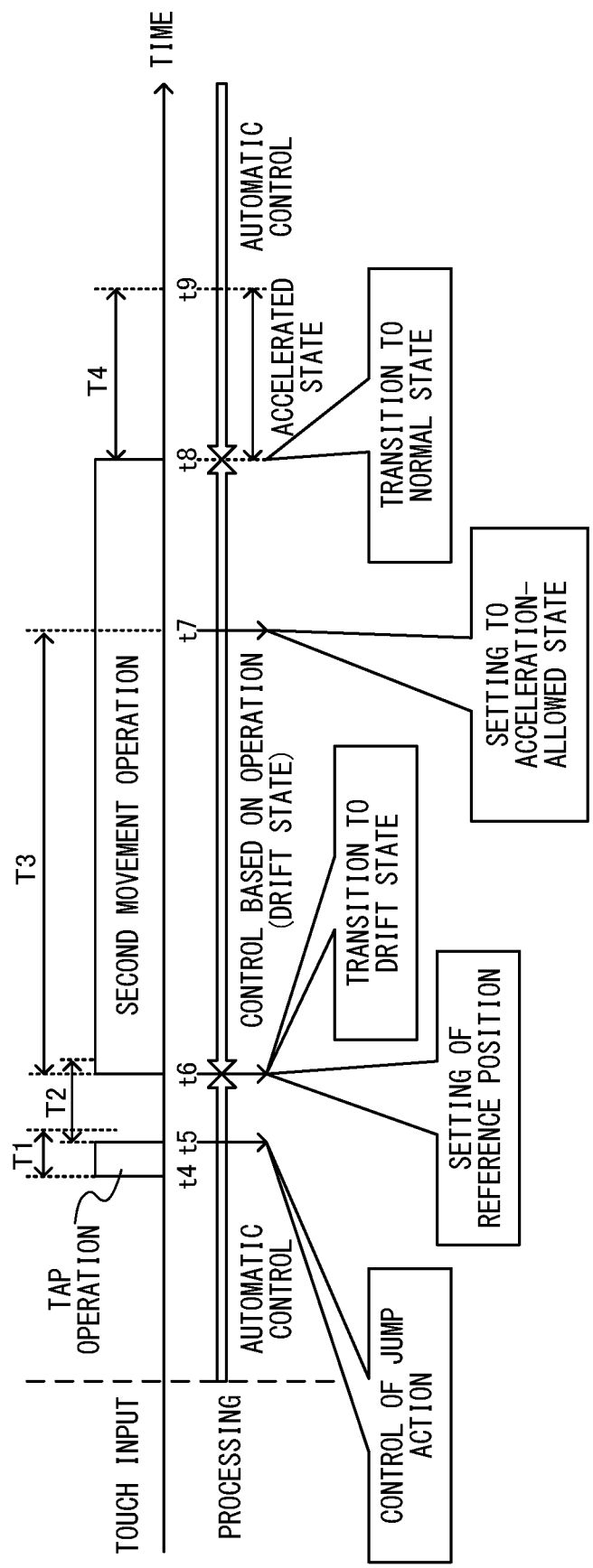
FIG. 9 shows examples of a tap operation and a second movement operation according to the embodiment.

FIG. 9 shows examples of the tap operation and the second movement operation according to the present embodiment. As shown in FIG. 9, the second movement operation is an operation in which a touch input is started within a predetermined time period T2 after the tap operation, and the touch input is continuously performed. In the present embodiment, when causing the object 31 to transition to the drift state and move, the user performs the second movement operation.

In the example of FIG. 9, the user first performs the tap operation. In the present embodiment, the tap operation is an operation in which a touch-off is performed within the predetermined time period T1 from a touch-on. In the example of FIG. 9, since the time period from timing t4 of a touch-on of a certain touch input to timing t5 of a touch-off is less than the time period T1, the terminal device 2 determines that an operation by this touch input is the tap operation (in other words, the tap operation is performed). If the time period from the timing of the touch-on of the touch input to the timing of the touch-off is equal to or longer than the time period T1, the terminal device 2 determines that the operation by the touch input is the aforementioned first movement operation.

In another embodiment, the terminal device 2 may determine whether or not the tap operation is performed, taking into consideration the position of the touch-on of the touch input and the position of the touch-off. That is, the terminal device 2 may determine that the tap operation is performed, when the distance between the position of the touch-on and the position of the touch-off is equal to or less than a predetermined value and the time period from the touch-on to the touch-off is less than the time period T1. Thus, the terminal device 2 can distinguish the tap operation from, for example, a flick operation, and therefore can determine the tap operation more accurately.

Figure 10:
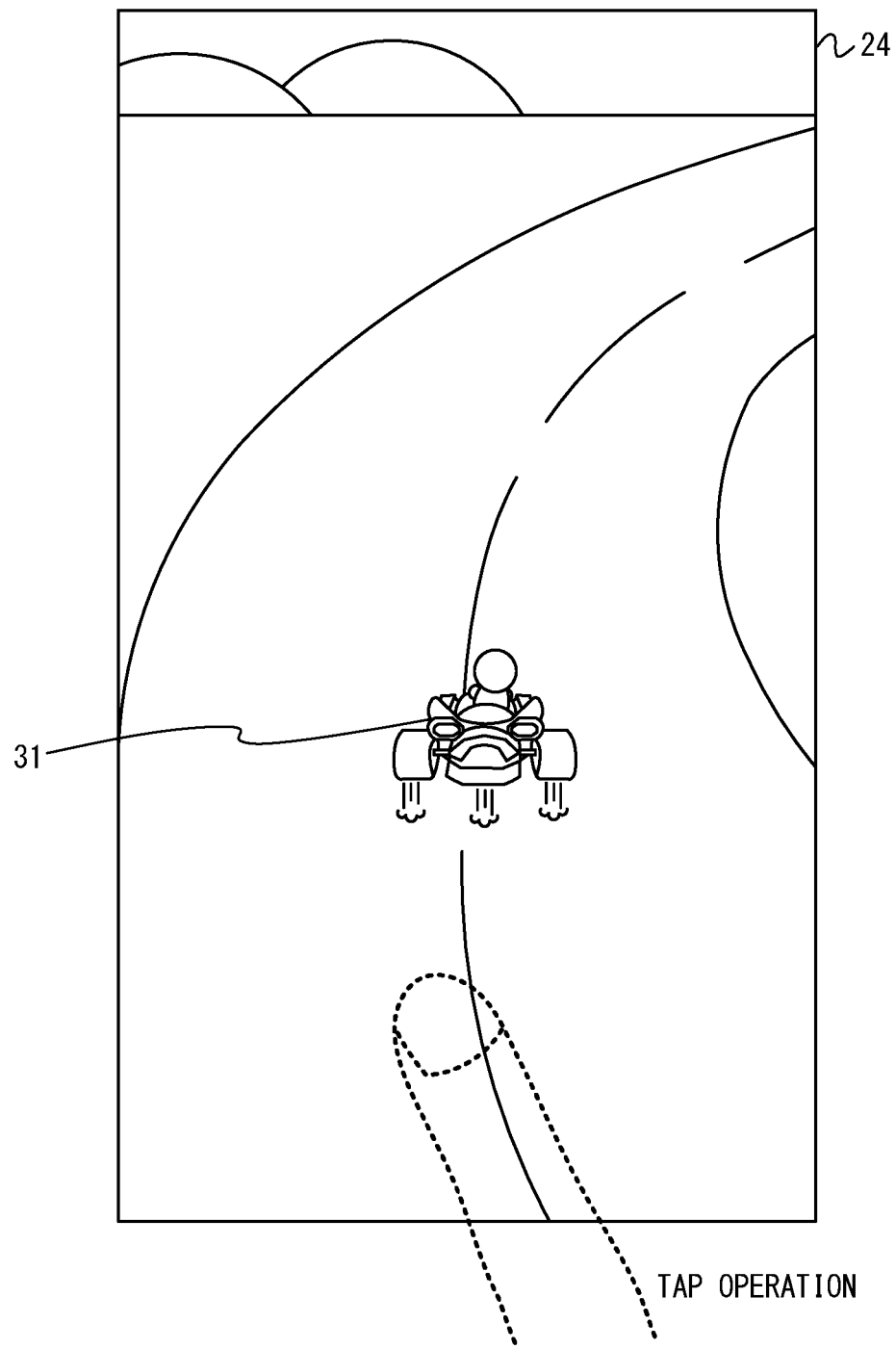
FIG. 10 shows an example of a game image representing a state in which an object performs a jump action.

In the present embodiment, the terminal device 2 causes the object 31 to perform a predetermined action (specifically, jump action) in response to the tap operation. FIG. 10 shows an example of a game image representing a state in which the object 31 performs a jump action. In the present embodiment, as shown in FIG. 10, the object 31 performs a jump action in response to the tap operation being performed by the user. That is, the terminal device 2 causes the object 31 to perform a jump action at timing t5 at which the tap operation is determined to be performed (in other words, at a timing of a touch-off of the tap operation). In another embodiment, the terminal device 2 may not execute a process according to the tap operation.

In the example of FIG. 9, the user performs the movement operation (i.e., the second movement operation) subsequently to the tap operation. That is, the user starts a next touch input at timing t6 at which an elapsed time from timing t5 of the touch-off of the tap operation is less than the predetermined time period T2 (refer to FIG. 9). The time period T2 may be set to a time period during which the object 31 performs a predetermined action according to the tap operation (e.g., if the predetermined action is a jump action, a time period from when the object 31 starts to jump to when the object 31 lands on the ground), or may be set to a time period longer than the above time period.

In the present embodiment, when the time length from the timing of a touch-off of a tap operation to the timing of a touch-on of a next touch input is within the predetermined time period T2, the terminal device 2 determines that the second movement operation is performed (in other words, the operation by this touch input is the second movement operation). When the time length from the timing of the touch-off of the tap operation to the timing of the touch-on of the next touch input is longer than the predetermined time period T2, the terminal device 2 determines that the operation by this touch input is not the second movement operation. In this case, the operation by this touch input is determined to be the tap operation or the first movement operation.

As described above, in the present embodiment, the terminal device 2 determines that the second movement operation is performed, on condition that the time period from an input of a tap operation to a touch input performed after end of the input of the tap operation is within a predetermined time period. In the present embodiment, the condition for determining that the second movement operation is performed is that "the time length from the timing of a touch-off of a tap operation to the timing of a touch-on of a next touch input is within the predetermined time period T2". In another embodiment, the condition for determining that the second movement operation is performed may be either of the following conditions.

The time period from the timing of a touch-on of a tap operation (timing t4 in the example of FIG. 9) to a touch-on of a next touch input (timing t6 in the example of FIG. 9) is within a predetermined time period.

The time period from the intermediate timing of a tap operation (in the example of FIG. 9, the intermediate timing between timing t4 and timing t5) to a touch-on of a next touch input is within a predetermined time period.

In the present embodiment, a first-time touch input in the second movement operation is a touch input of the tap operation. However, in another embodiment, the first-time touch input is not limited to the touch input of the tap operation, and may be any touch input (refer to the section of (Modification regarding first input) described later). At this time, the condition for determining that the second movement operation is performed may be that "the time length from the timing of a touch-on of a first-time touch input to a touch-on of a next touch input is within a predetermined time period".

In another embodiment, the condition for determining that the second movement operation is performed may include a condition that "the next touch input is continued for a predetermined input continuation time or more". This input continuation time may be equal to the aforementioned time period T1, for example.

As described above, at least on a condition that the time period from the timing based on start or end of a first input (e.g., an input of a tap operation) to the timing at which a second input (i.e., a touch input to be performed next to the first input) is started is within the predetermined time period T2, the terminal device 2 executes a process according to this condition (i.e., a process according to the second movement operation). Thus, the terminal device 2 can appropriately calculate the time period from the first input to the second input, and therefore can accurately determine whether or not to execute the process. Furthermore, according to the present embodiment, since the condition for the second movement operation is that the user performs the first input before the second input for the movement operation (more specifically, the user performs the second input within the predetermined time period T2 after the first input), it is possible to reduce a risk that the user unintentionally performs the second movement operation (in other words, against the user's intention, it is determined that the second movement operation is performed).

In another embodiment, the terminal device 2 may determine whether or not the second movement operation is performed, taking into consideration the input position of the tap operation and the input position of the next touch input. That is, the terminal device 2 may determine that the second movement operation is performed, at least on a condition that the distance between the input position of the tap operation and the input position of the next touch input is equal to or less than a predetermined value. The "input position of the tap operation" may be the position of a touch-on of the tap operation, the position of a touch-off of the tap operation, or a position based on the touch-on position and the touch-off position (e.g., the position of a midpoint between the touch-on position and the touch-off position). The "input position of the next touch input" may be, for example, the position of a touch-on of the touch input.

As shown in FIG. 9, when it is determined that the second movement operation is performed, a reference position is set as in the case of the first movement operation. As for the second movement operation, since determination that the second movement operation is performed is made when a touch-on is performed, a reference position is set based on the input position at the time of the touch-on. That is, the terminal device 2 sets, as a reference position, the input position at the touch-on in the second movement operation, i.e., the input position at start of the touch input.

In another embodiment, also in the second movement operation, a reference position may be set based on an input position that is detected at a timing later than the touch-on, as in the first movement operation. For example, when distinguishing the second movement operation from another operation (e.g., tap operation), the terminal device 2 may set a reference position based on an input position at a time point when the second movement operation is determined to be performed. Furthermore, also in the second movement operation, as in the first movement operation, if an input position at the time of setting a reference position is located near an end of the screen of the display section 24, the terminal device 2 may set, as a reference position, a position at a predetermined distance from the end of the screen.

Furthermore, as shown in FIG. 9, when determining that the second movement operation is performed, the terminal device 2 causes the state of the object 31 to transition to the drift state. Therefore, the second movement operation is performed on the object 31 in the drift state. The terminal device 2 may control the direction of the object in the drift state, in accordance with the direction between the input position and the reference position in the second movement operation. That is, when the input position is on the left side with respect to the reference position, the object may be controlled to a leftward drift state (i.e., a drift state in which the object turns to the left). When the input position is on the right side with respect to the reference position, the object may be controlled to a rightward drift state (i.e., a drift state in which the object turns to the right).

In another embodiment, also in the second movement operation, as in the first movement operation, the terminal device 2 may start control for the object 31 on condition that the input distance exceeds a predetermined control start distance. At this time, the terminal device 2 may cause the object 31 to transition to the drift state on condition that the input distance exceeds the predetermined control start distance, after the second movement operation is started. Thus, the timing of executing the transition process (i.e., the process of causing the object 31 to transition to the drift state) in response to the touch input of the second movement operation is not limited to the timing of the touch-on, and may be a timing at which the predetermined condition regarding the input position of the touch input is satisfied after the touch-on.

Figure 11:
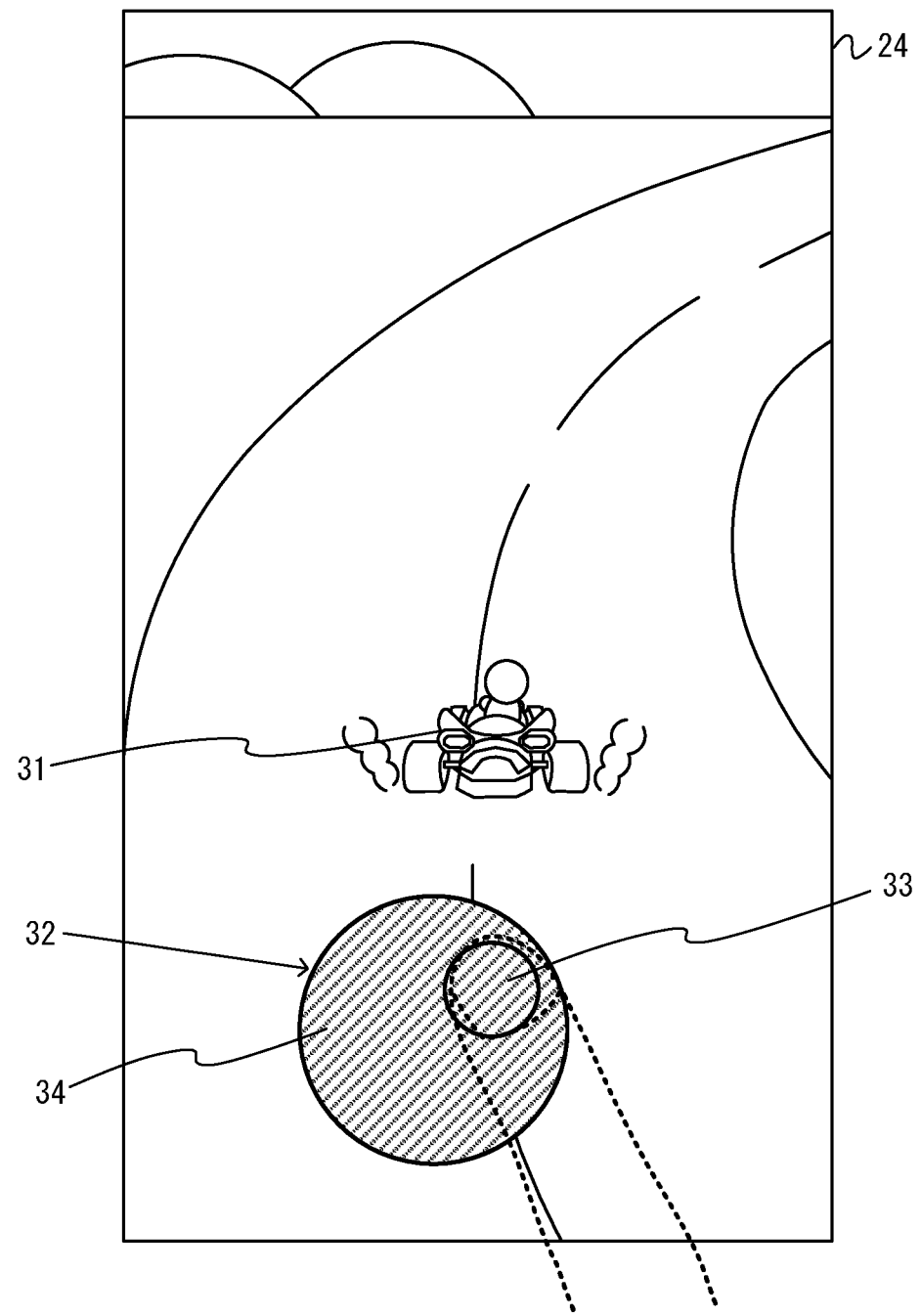
FIG. 11 shows an example of a game image including the object in a drift state.

FIG. 11 shows an example of a game image including an object in the drift state. As described above, the drift state is a state in which movement control is performed by a method different from movement control performed in the normal state. As shown in FIG. 11, in the drift state, a state in which the object 31 is drifting (specifically, a state in which smoke comes from tires) is displayed.

In the present embodiment, the operation method for the second movement operation in the drift state is the same as that for the first movement operation in the normal state. That is, even when the object 31 is in the drift state, the terminal device 2 specifies an input instruction (specifically, an input direction and an input distance) based on a touch input, as in the case where the object 31 is in the normal state. Thus, the user can operate the object 31 by the same operation method regardless of whether the object 31 is in the normal state or in the drift state. However, the process of controlling movement of the object 31 based on the input instruction differs between the normal state and the drift state.

In the present embodiment, in the drift state, movement of the object 31 is controlled such that the object 31 can go around a curve more sharply than in the normal state at the same speed. A specific method of movement control in the drift state is arbitrary. In another embodiment, in the drift state, movement of the object 31 may be controlled such that the object 31 can go around a curve more quickly than in the normal state. Thus, in the drift state, the terminal device 2 may perform movement control for the object 31 such that the user can control movement of the object 31 more advantageously in terms of the game than in the normal state.

When the continuous touch input in the second movement operation is ended, the terminal device 2 causes the object 31 to transition from the drift state to the normal state. In the example of FIG. 9, when the second movement operation is ended at timing t8, the object 31 transitions from the drift state to the normal state. As described above, during a time period in which no touch input is performed, the terminal device 2 automatically controls the object 31.

In the example of FIG. 9, the user performs the second movement operation continuously for a predetermined time period T3 or more. Thus, the object 31 is set (in the drift state and) in an acceleration-allowed state. That is, in the present embodiment, when a predetermined acceleration condition is satisfied while the object 31 is in the drift state, the terminal device 2 sets the object 31 in the acceleration-allowed state. Although details will be described later, if the movement operation is ended (i.e., a touch-off is performed) after the object 31 has been set in the acceleration-allowed state, movement of the object 31 is controlled such that the object 31 is accelerated more than usual.

Figure 12:
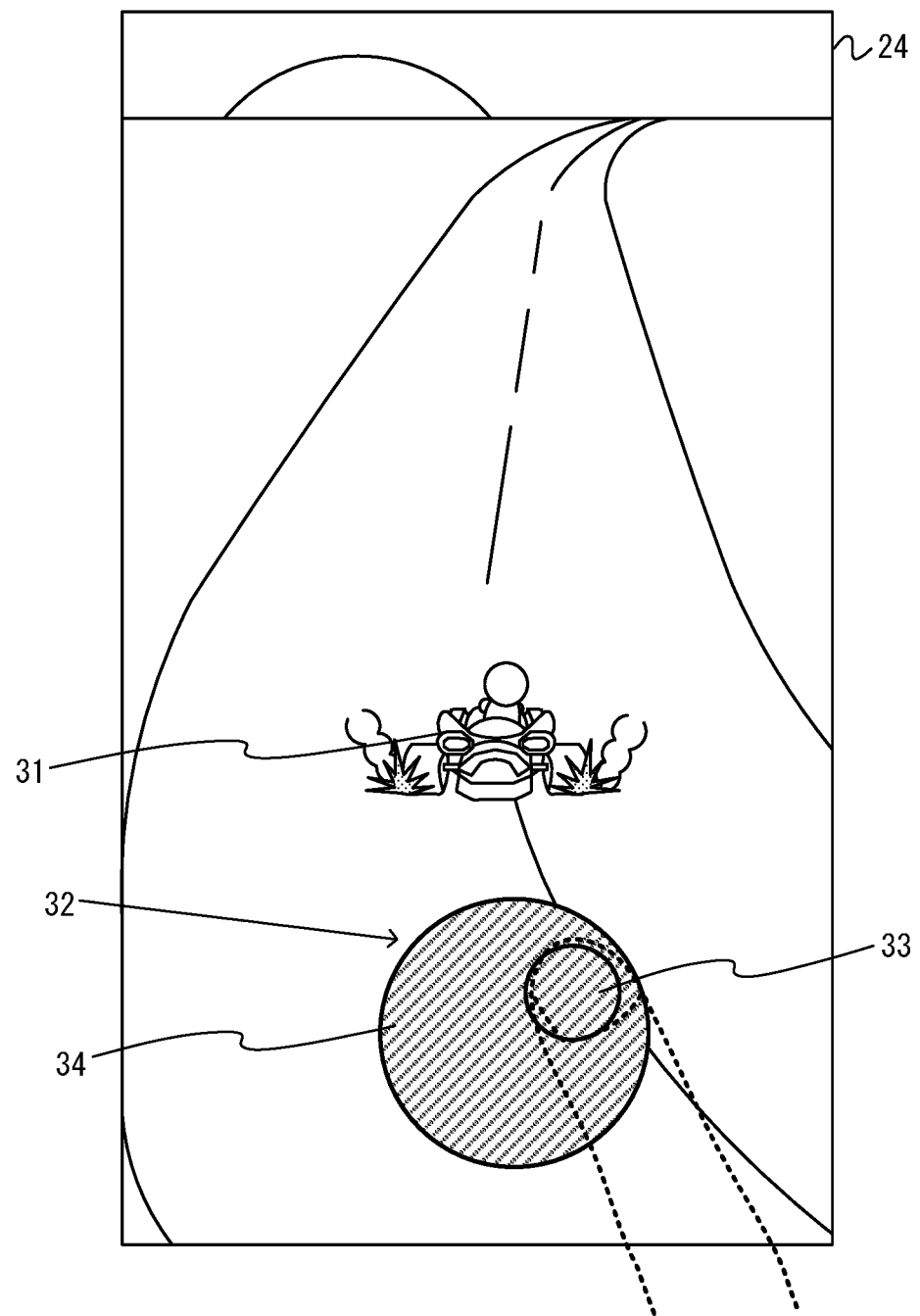
FIG. 12 shows an example of a game image including the object in an acceleration-allowed state.

FIG. 12 shows an example of a game image including an object in the acceleration-allowed state. As shown in FIG. 12, in the acceleration-allowed state, the object 31 is displayed in a display mode representing the drift state (specifically, a display mode in which smoke comes from tires) and in a display mode representing the acceleration-allowed state (specifically, a display mode in which sparks are caused from tires). In the present embodiment, the speed of the object 31 in the drift state is constant regardless of whether the object 31 is in the acceleration-allowed state. However, in another embodiment, when the object 31 in the drift state is in the acceleration-allowed state, the speed of the object 31 may be higher than that in the case where the object 31 is in the drift state but is not in the acceleration-allowed state.

In the present embodiment, the acceleration condition is that the drift state is continued for the predetermined time period T3. That is, the terminal device 2 sets the object 31 in an acceleration-allowed state in response to elapse of the time period T3 from when the object 31 is set in the drift state (in other words, from when the second movement operation is started) (refer to FIG. 9). In the example of FIG. 9, the object 31 is set in the acceleration-allowed state at timing t7 at which the time period T3 has passed from timing t6 of the touch-on of the second movement operation.

In another embodiment, the content of the acceleration condition is arbitrary. For example, the acceleration condition may include a condition that "a continuous touch input represents a predetermined gesture in the drift state", or may include a condition that "a predetermined operation is performed by a continuous touch input in the drift state". Thus, the acceleration condition may be that an input, which satisfies a predetermined condition regarding an input direction and/or an input distance, is made, or that this state is continued for a predetermined time period.

As described above, in the present embodiment, when an input of the second movement operation, which is continuously performed from start of the input, satisfies a predetermined condition (i.e., the acceleration condition), the terminal device 2 executes, on the object 31, a second process (i.e., a process of setting the object 31 in the acceleration-allowed state) which is different from the first process (i.e., a process of setting the object 31 in the acceleration-allowed state). Thus, the user can cause the terminal device 2 to execute the first process and further cause the terminal device 2 to execute the second process, during the second movement operation. That is, the terminal device 2 allows the user to perform more various game operations by the continuous touch input.

The second process may be any process regarding movement of the object 31. For example, the second process may be a process of causing the object 31 to move by a predetermined control method. Therefore, in the present embodiment, a "process of causing the object 31 to move in an accelerated state", which is described later, is also an example of the second process. At this time, the aforementioned predetermined condition is that "the second movement operation is ended" Thus, the predetermined condition may be that "a state, in which a continuous touch input in the second movement operation satisfies a certain condition, continues for a predetermined time period", or that "a state, in which a continuous touch input after execution of the first process satisfies a certain condition, continues for a predetermined time period and then the continuous touch input in the second movement operation is ended". In another embodiment, the predetermined condition may be that "a continuous touch input after execution of the first process is ended".

In the example of FIG. 9, the user performs an acceleration operation (i.e., operation to end the touch input) at timing t8 after timing t7 at which the object 31 is set in the acceleration-allowed state. The object 31 travels in the accelerated state in accordance with the acceleration operation. That is, if the second movement operation is ended while the object 31 is in the acceleration-allowed state, the terminal device 2 causes the object 31 to move in the accelerated state (refer to FIG. 9). Here, the "accelerated state" is a state in which the object 31 moves at a higher speed than in the normal state.

Figure 13:
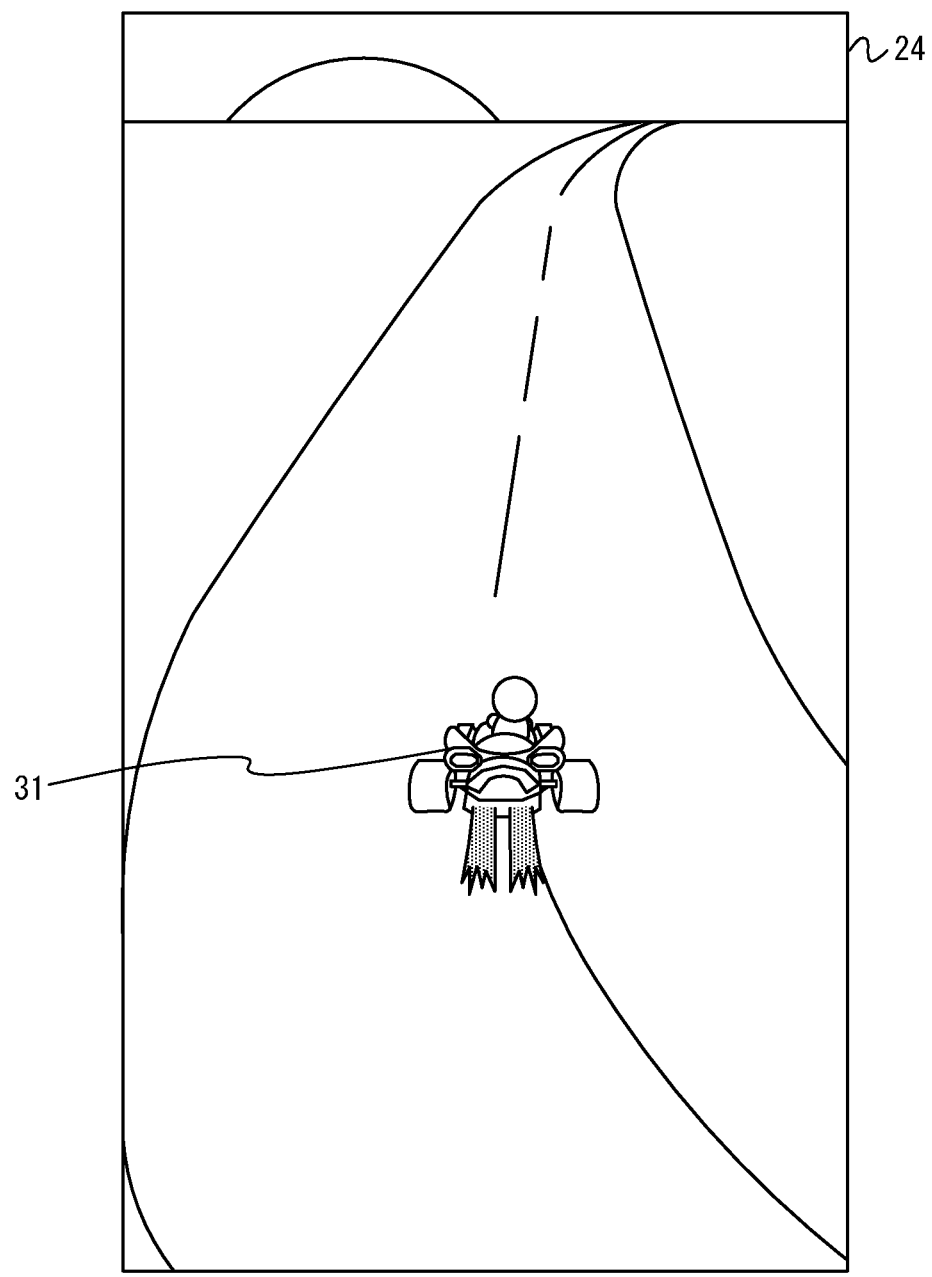
FIG. 13 shows an example of a game image including the object in an accelerated state.

FIG. 13 shows an example of a game image including an object in the accelerated state. As shown in FIG. 13, in the accelerated state, a state in which the object 31 is in the accelerated state (specifically, a state in which the object 31 jets sparks backward) is displayed.

In the present embodiment, the accelerated state is continued for a predetermined time period T4 (in the example of FIG. 9, from timing t8 to timing t9 at which a predetermined time period has passed). That is, the terminal device 2 causes the object 31 to move in the accelerated state until the time period T4 passes from end of the second movement operation, and thereafter, the terminal device 2 performs automatic control in the normal state (refer to FIG. 9).

As described above, the user operates the object 31 in the drift state to be set in the acceleration-allowed state in the second movement operation and then ends the second movement operation, thereby causing the object 31 to travel faster. For example, the user causes the object 31, which has transitioned to the drift state, to go around a curve of a racing course and then travel in the accelerated state from a position at which the racing course extends straight ahead, thereby causing the object 31 to travel faster.

In another embodiment, the object 31 may take multiple stages of acceleration-allowed states. For example, the object 31 may be controlled such that the object 31 is set in a first acceleration-allowed state in response to the drift state being continued for the time period T3, and then the object 31 is set in a second acceleration-allowed state in response to the first acceleration-allowed state being continued for a predetermined time period T3' (T3'>T3). At this time, the terminal device 2 controls the object 31 such that the accelerated state continues longer in the case where the object 31 transitions from the second acceleration-allowed state to the accelerated state (in response to end of the second movement operation) than in the case where the object 31 transitions from the first acceleration-allowed state to the accelerated state (in response to end of the second movement operation). In another embodiment, the terminal device 2 may control the object 31 such that the speed in the accelerated state is longer in the aforementioned case than in the case where the object 31 transitions from the first acceleration-allowed state to the accelerated state.

Furthermore, the terminal device 2 may display the object 31 such that the multiple stages of acceleration-allowed states can be distinguished from each other. For example, the terminal device 2 may display the object 31 such that the color and/or size of sparks differs between the first acceleration-allowed state and the second acceleration-allowed state.

As described above, in the present embodiment, the user is allowed to perform the multiple types of operations shown in FIG. 9 (i.e., jump operation, transition operation to the drift state, movement operation, acceleration state setting operation, and acceleration operation) by a set of touch inputs including a tap operation and a second movement operation. Thus, in the present embodiment, the terminal device 2 allows the user to perform various game operations by using the pointing device (i.e., the touch panel).

In the present embodiment, the user can perform each of the first movement operation, the tap operation, and the second movement operation with one finger. Therefore, according to the present embodiment, the user can operate the object 31 with one finger, whereby the user can hold the terminal device 2 with one hand and perform game operations with a thumb of the hand, for example.

While the case where the respective operations shown in FIG. 5 or FIG. 9 are performed has been described above, operations other than these operations may be realized by a touch input in the above embodiment. For example, the terminal device 2 may cause the display section 24 to display icons indicating items, and may receive a touch input designating an icon, as an operation to cause the object 31 to use an item.

[3. Specific Example of Processing in Information Processing System]

Figure 14:
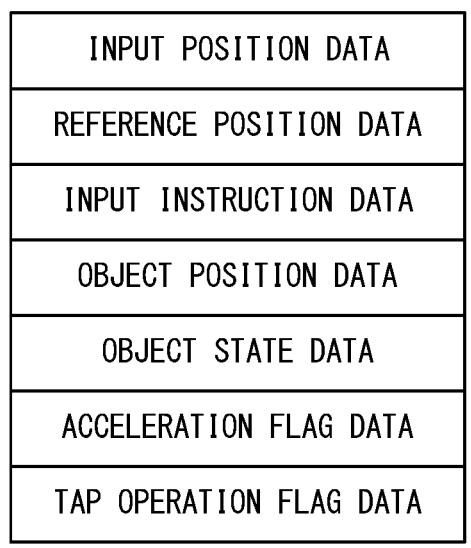
FIG. 14 shows examples of data used for game processing in a non-limiting information processing system.
Figure 15:
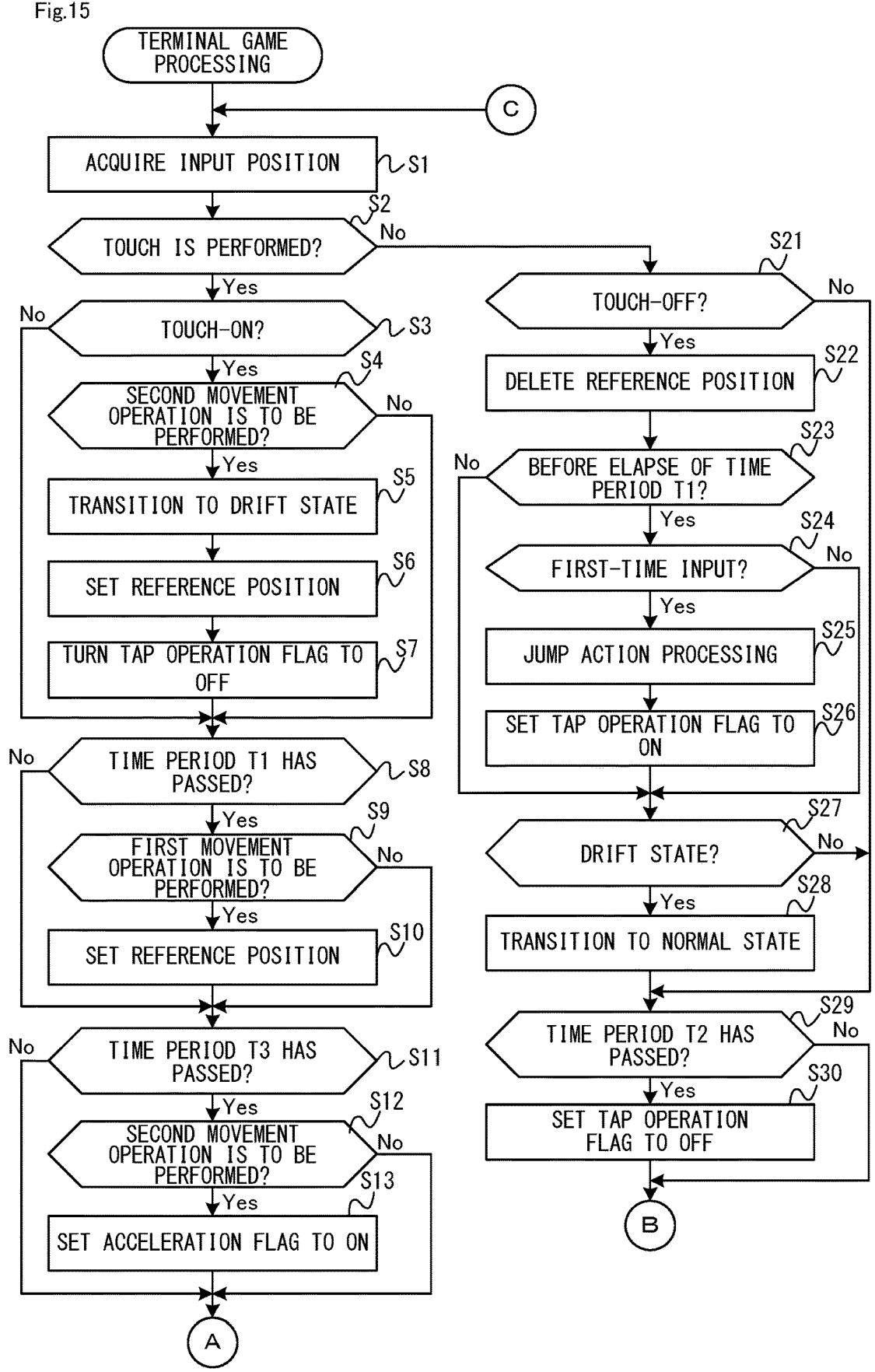
FIG. 15 is a flowchart showing an example of a flow of game processing executed by a non-limiting terminal device.
Figure 16:
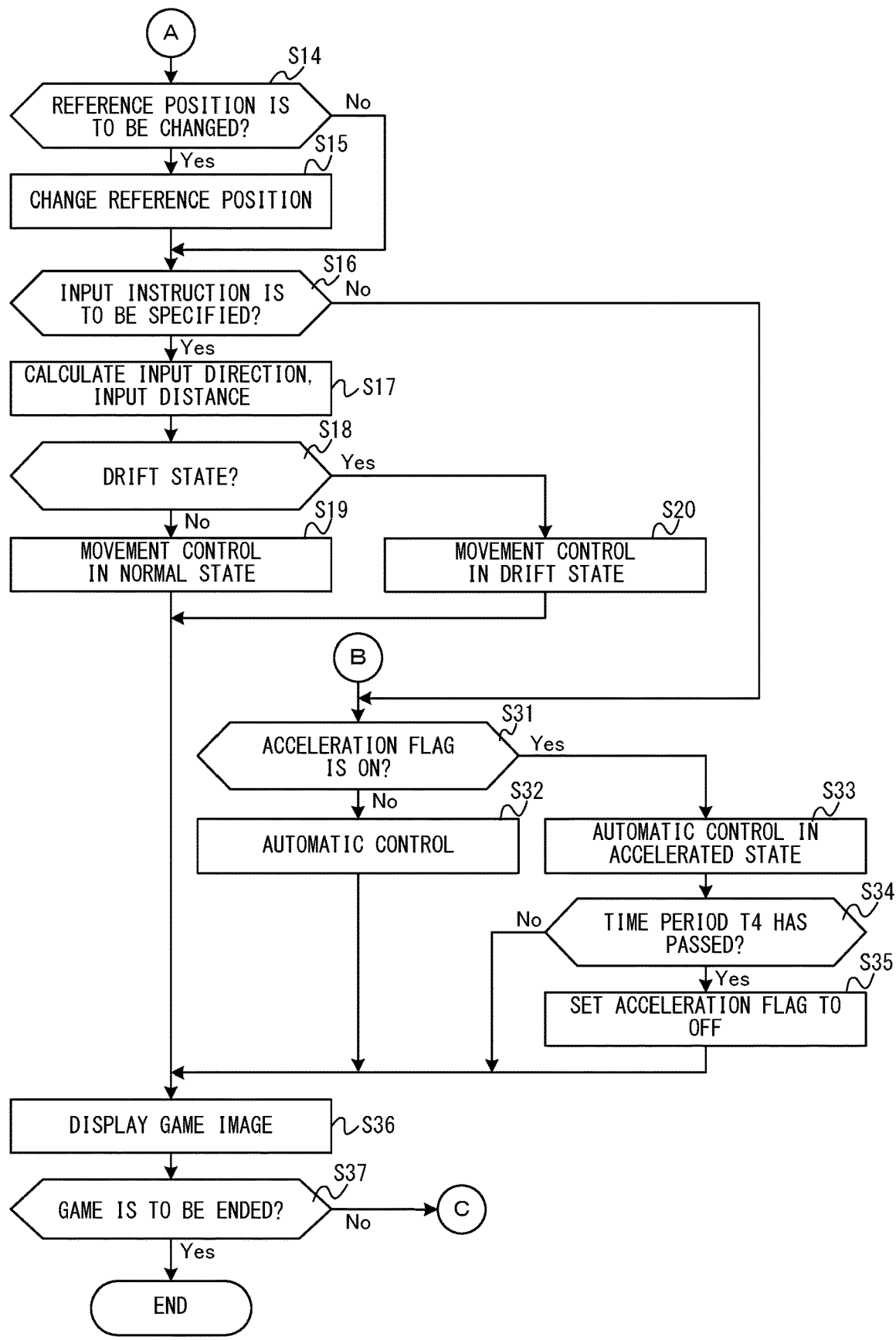
FIG. 16 is a flowchart showing an example of a flow of game processing executed by a non-limiting terminal device.

With reference to FIGS. 14 to 16, a description will be given of a specific example in the case where the game processing whose outline has been described above is executed in the information processing system.

[3-1. Data Used for Processing]

With reference to FIG. 14, specific example of data used for the game processing in the information processing system will be described. FIG. 14 shows examples of data used for the game processing in the information processing system. The data shown in FIG. 14 are stored in a storage section of the terminal device 2 (specifically, a memory of the processing section 21 and/or the storage section 22). As shown in FIG. 14, the terminal device 2 stores therein input position data, reference position data, input instruction data, object position data, object state data, acceleration flag data, and tap operation flag data.

The input position data is data indicating the aforementioned input position. In the present embodiment, the input position data includes data indicating the current input position (in other words, the latest input position), and includes data indicating previous input positions. Specifically, the input position data includes data indicating input positions, regarding a continuous touch input, which are continuously inputted from a touch-on. The content of the input position data may be reset at the time of a touch-off.

The reference position data is data indicating the aforementioned reference position. Each of the input position data and the reference position data is data of two-dimensional coordinates indicating a position on the input surface of the touch panel 23.

The input instruction data indicates the content of the aforementioned input instruction which is specified based on the input position. Specifically, the input instruction data indicates the aforementioned input direction and input distance. As described above, the input instruction data may be data indicating a numerical value in which the input direction is represented by a positive or negative sign and the input distance is represented by an absolute value.

The object position data indicates the position of the object 31 in the game space. For example, the object position data is data indicating three-dimensional or two-dimensional coordinates indicating a position in the game space.

The object state data indicates the state of the object 31. Specifically, the object state data is data indicating that the object 31 is in the normal state or the drift state. In the present embodiment, the object 31 is in the normal state when a game is started (i.e., at start of a racing game), and the object state data indicating the normal state is stored.

The acceleration flag data is data indicating an acceleration flag which represents whether or not to perform control to cause the object 31 to move in the accelerated state. Although details will be described later, when the object 31 is in the aforementioned acceleration-allowed state or accelerated state, the acceleration flag is set at ON. When the object 31 is neither in the acceleration-allowed state nor in the accelerated state, the acceleration flag is set at OFF. In the present embodiment, the acceleration flag is set to OFF when the game is started.

The tap operation flag data is data indicating a tap operation flag which represents whether or not a tap operation has just been performed. Although details will be described later, during a time period until the aforementioned time period T2 passes from the timing (e.g., timing t5 shown in FIG. 9) at which a tap operation has been performed, the tap operation flag is set at ON. During time periods other than the aforementioned time period, the tap operation flag is set at OFF.

[3-2. Example of Game Processing]

FIGS. 15 and 16 are flowcharts showing a flow of exemplary game processing executed by the terminal device. A series of process steps shown in FIGS. 15 and 16 is started in response to start of the racing game after the game program stored in the storage section 22 is activated.

In the present embodiment, the CPU (in other words, a processor) of the processing section 21 of the terminal device 2 executes the game program (specifically, the game program for the racing game) stored in the storage section 22, thereby executing the processes in steps shown in FIGS. 15 and 16. However, in another embodiment, some of the processes in the steps may be executed by a processor (e.g., a dedicated circuit or the like) other than the CPU. Furthermore, the processes in the steps shown in FIGS. 15 and 16 are merely examples, and the processing order of the steps may be changed or other processes may be executed in addition to (or instead of) the processes in the steps, so long as similar results can be obtained.

In another embodiment, the processes in the steps shown in FIGS. 15 and 16 may be executed by cooperation of the terminal device 2 and the server 1. That is, some of the processes in the steps shown in FIGS. 15 and 16 may be executed by the server 1. At this time, the server 1 receives data to be used for the processes, from the terminal device 2 via the network 3. The server 1 transmits resultant data obtained through the processes, to the terminal device 2 via the network 3.

The processing section 21 of the terminal device executes the processes in the steps shown in FIGS. 15 and 16 by using a memory. That is, the CPU of the processing section 21 stores, in the memory, information (in other words, data) obtained in the respective process steps. When using the information in the subsequent process steps, the CPU reads out the information from the memory and uses the information.

In step S1 shown in FIG. 15, the processing section 21 acquires an input position from the touch panel 23. That is, the touch panel 23 detects an input position on the input surface thereof, and outputs detection result data indicating the detected input position. The processing section 21 acquires the detection result data from the touch panel 23, and stores input position data including the detection result data in the memory. In the present embodiment, when no touch input is performed to the touch panel 23, the touch panel 23 outputs detection result data indicating that there is no touch input. In this case, the processing section 21 acquires the detection result data indicating that there is no touch input. Next to step S1, the process in step S2 is executed.

In step S2, the processing section 21 determines whether or not a touch input is performed. The processing section 21 performs the determination in step S2, based on the input position data (in other words, the data acquired from the touch panel 23 in the process of step S1) stored in the memory. When the result of the determination in step S2 is positive, the process in step S3 is executed. When the result of the determination in step S2 is negative, the process in step S21 described later is executed.

In step S3, the processing section 21 determines whether or not the touch input is an input at the time of a touch-on. The processing section 21 performs the determination in step S3, based on the input position data stored in the memory. That is, the touch input is determined to be an input at the time of a touch-on when detection result data acquired in step S1 in the last processing loop (specifically, a processing loop of steps S1 to S37) is a value indicating that there is no touch input. On the other hand, the touch input is determined not to be an input at the time of a touch-on when the detection result data acquired in the last processing loop is a value indicating that there is a touch input. When the result of the determination in step S3 is positive, the process in step S4 is executed. When the result of the determination in step S3 is negative, the processes in steps S4 to S7 are skipped and the process in step S8 described later is executed.

In step S4, the processing section 21 determines whether or not the second movement operation is performed (i.e., whether or not the operation by a touch input started in the current process loop is the second movement operation). The processing section 21 performs the determination in step S4, based on the tap operation flag data stored in the memory. Although details will be described later, the tap operation flag is set at ON during a time period until the predetermined time period T2 passes from when the tap operation has been determined to be performed (steps S21 to S26, S29, S30 described later). Therefore, the processing section 21 determines that the second movement operation is performed when the value indicated by the tap operation flag data is ON, and determines that no second movement operation is performed (i.e., the tap operation or the first movement operation is performed) when the value indicated by the tap operation flag data is OFF. When the result of the determination in step S4 is positive, the process in step S5 is executed. When the result of the determination in step S4 is negative, the processes in steps S5 to S7 are skipped, and the process in step S8 described later is executed.

In step S5, the processing section 21 causes the state of the object 31 to transition to the drift state. That is, the processing section 21 stores the object state data indicating the drift state in the memory. Next, to step S5, the process in step S6 is executed.

In step S6, the processing section 21 sets a reference position. That is, the processing section 21 sets, as a reference position, the input position acquired through the process in step S1 in the current processing loop. The processing section 21 stores reference position data indicating the set reference position in the memory. Next to step S6, the process in step S7 is executed.

In step S7, the processing section 21 sets the tap operation flag to OFF. That is, the processing section 21 stores, in the memory, the tap operation flag data indicating that the tap operation flag is OFF. Next to step S7, the process in step S8 is executed.

In step S8, the processing section 21 determines whether or not the time period T1 has just elapsed from the touch-on of the continuous touch input that is currently performed. In step S8, when the elapsed time from the touch-on is equal to the time period T1, the result of the determination is positive, and when the elapsed time from the touch-on is different from the time period T1, the result of the determination is negative. When the result of the determination in step S8 is positive, the process in step S9 is executed. When the result of the determination in step S8 is negative, the processes in steps S9 and S10 are skipped, and the process in step S11 described later is executed.

In step S9, the processing section 21 determines whether or not the first movement operation is being performed. For example, the processing section 21 can perform the determination in step S9 based on the object state data stored in the memory. That is, when the object state data indicates the normal state, it is determined that the first movement operation is being performed, and when the object state data indicates the drift state, it is determined that no first movement operation is performed (i.e., the second movement operation is performed). When the result of the determination in step S9 is positive, the process in step S10 is executed. When the result of the determination in step S9 is negative, the process in step S10 is skipped, and the process in step S11 described later is executed.

In step S10, the processing section 21 sets a reference position. The process in step S10 is the same as the process in step S6. Next to step S10, the process in step S11 is executed.

In step S11, the processing section 21 determines whether or not the time period T3 has just elapsed from the touch-on of the continuous touch input that is currently performed. In step S11, when the elapsed time from the touch-on is equal to the time period T3, the result of the determination is positive, and when the elapsed time from the touch-on is different from the time period T3, the result of the determination is negative. When the result of the determination in step S11 is positive, the process in step S12 is executed. When the result of the determination in step S11 is negative, the processes in steps S12 and S13 are skipped, and the process in step S16 described later (refer to FIG. 16) is executed.

In step S12, the processing section 21 determines whether or not the second movement operation is being performed. For example, the processing section 21 can perform the determination in step S12 based on the object state data stored in the memory. That is, when the object state data indicates the drift state, it is determined that the second movement operation is being performed, and when the object state data indicates the normal state, it is determined that no second movement operation is performed (i.e., the first movement operation is performed). When the result of the determination in step S12 is positive, the process in step S13 is executed. When the result of the determination in step S12 is negative, the process in step S13 is skipped, and the process in step S16 described later is executed.

In step S13, the processing section 21 sets the acceleration flag to ON. That is, the processing section 21 stores, in the memory, acceleration flag data indicating that the acceleration flag is ON. Thus, the object 31 is set (in the drift state and) in the acceleration-allowed state. Next to step S13, the process in step S14 described later is executed.

The processes in steps S14 to S20 will be described with reference to FIG. 16. In step S14, the processing section 21 determines whether or not the reference position is to be changed. That is, based on the input position data and the reference position data stored in the memory, the processing section 21 performs the aforementioned determination by the method described in the section of (Reference position changing process). When the result of the determination in step S14 is positive, the process in step S15 is executed. When the result of the determination in step S14 is negative, the process in step S15 is skipped and the process in step S16 described later is executed.

In step S15, the processing section 21 changes the reference position. That is, based on the input position data and the reference position data stored in the memory, the processing section 21 calculates a post-change reference position by the method described in the section of (Reference position changing process). Furthermore, the processing section 21 updates the reference position data stored in the memory to the content indicating the calculated post-change reference position. Next to step S15, the process in step S16 is executed.

In step S16, the processing section 21 determines whether or not an input instruction is to be specified. Specifically, the processing section 21 performs the determination in step S16 depending on whether or not the reference position data is stored in the memory. When the result of the determination in step S16 is positive, the process in step S17 is executed. When the result of the determination in step S16 is negative, the process in step S31 described later is executed.

In step S17, the processing section 21 specifies the content of the input instruction. That is, the processing section 21 calculates an input direction and an input distance with reference to the input position data and the reference position data stored in the memory. A specific method for calculating the input direction and the input distance is the method described in the section of [2-2-1. First movement operation]. The processing section 21 stores, in the memory, input instruction data indicating the calculated input direction and input distance. Next to step S17, the process in step S18 is executed.

In step S18, the processing section 21 determines whether or not the object 31 is in the drift state, based on the object state data stored in the memory. When the result of the determination in step S18 is negative (i.e., when the object 31 is in the normal state), the process in step S19 is executed. When the result of the determination in step S18 is positive (i.e., when the object 31 is in the drift state), the process in step S20 is executed.

In step S19, based on the input instruction data stored in the memory, the processing section 21 performs movement control for the object 31 in the normal state. Specifically, the processing section 21 calculates a movement direction and a movement distance of the object 31 in one frame time, and calculates a post-movement position of the object 31, based on the calculated movement direction and movement distance, and the current position of the object 31. The movement control in step S12 is performed by the method described in the section of [2-2-1. First movement operation]. The processing section 21 stores, in the memory, object position data indicating the calculated post-movement position. Next to step S19, the process in step S36 described later is executed.

In step S20, the processing section 21 performs movement control for the object 31 in the drift state. Also in step S20, as in step S19, the processing section 21 calculates a post-movement position of the object 31, based on the input instruction data stored in the memory. However, the movement control in step S20 is, unlike the movement control in step S19, performed by the method described in the section of [2-2-2. Second movement operation]. The processing section 21 stores, in the memory, object position data indicating the calculated post-movement position. Next to step S20, the process in step S36 is executed.

Referring back to FIG. 15, the processes in steps S21 to S30 will be described. In step S21, the processing section 21 determines whether or not the touch input is ended (i.e., whether or not a touch-off is performed). The processing section 21 performs the determination in step S18 based on the input position data stored in the memory. That is, when detection result data acquired in step S1 in the last processing loop is a value indicating that there is a touch input, the processing section 21 determines that the touch input is ended. When the detection result data is a value indicating that there is no touch input, the processing section 21 determines that the touch input is not ended yet. When the result of the determination in step S21 is positive, the process in step S22 is executed. When the result of the determination in step S21 is negative, the processes in steps S22 to S28 are skipped, and the process in step S29 described later is executed.

In step S22, the processing section 21 deletes the set reference position. That is, the processing section 21 deletes the reference position data stored in the memory. Next to step S22, the process in step S23 is executed.

In step S23, the processing section 21 determines whether or not it is before the timing at which the time period T1 passes from the touch-on of the continuous touch input that is performed last (in other words, the continuous touch input that is determined to be "touch-off" in step S21). When the result of the determination in step S23 is positive, the process in step S24 is executed. When the result of the determination in step S23 is negative, the processes in steps S24 to S26 are skipped, and the process in step S27 described later is executed.

In step S24, the processing section 21 determines whether or not the touch input, which has been determined to be "touch-off" in step S21, is the first-time input (in other words, whether or not the touch input is an input in the second movement operation). For example, the processing section 21 can perform the determination in step S24 by determining whether or not the object 31 is in the normal state, based on the object state data stored in the memory. When the result of the determination in step S24 is positive, the process in step S25 is executed. When the result of the determination in step S24 is negative, the processes in steps S25 and S26 are skipped, and the process in step S27 described later is executed.

In step S25, the processing section 21 causes the object 31 to perform a jump action. In the present embodiment, the jump action of the object 31 is performed over a predetermined number of frames although not illustrated in FIGS. 15 and 16. Therefore, while the object 31 is caused to perform the jump action, the processing section 21 need not perform control for the object 31 according to the touch input. Next to step S25, the process in step S26 is executed.

In step S26, the processing section 21 sets the tap operation flag to ON. That is, the processing section 21 stores, in the memory, the tap operation flag data indicating that the tap operation flag is ON. Next to step S26, the process in step S27 is executed.

In step S27, the processing section 21 determines whether or not the object state data stored in the memory indicates the drift state. When the result of the determination in step S27 is positive, the process in step S28 is executed. When the result of the determination in step S27 is negative, the process in step S28 is skipped, and the process in step S29 is executed.

In step S28, the processing section 21 causes the state of the object 31 to the normal state. That is, the processing section 21 stores the object state data indicating the normal state in the memory. Next to the step S28, the process in step S29 is executed.

In step S29, the processing section 21 determines whether or not the time period T2 has just elapsed from the touch-on of the continuous touch input that is performed last. In step S29, when the elapsed time from the touch-on is equal to the time period T2, the result of the determination is positive, and when the elapsed time from the touch-on is different from the time period T2, the result of the determination is negative. When the result of the determination in step S29 is positive, the process in step S30 is executed. When the result of the determination in step S29 is negative, the process in step S30 is skipped, and the process in step S31 (refer to FIG. 16) is executed.

In step S30, the processing section 21 sets the tap operation flag to OFF. That is, the processing section 21 stores, in the memory, the tap operation flag data indicating that the tap operation flag is OFF. Next to step S30, the process in step S31 is executed.

Referring back to FIG. 16, the processes in steps S31 to S37 will be described. In step S31, the processing section 21 determines whether or not the acceleration flag is set at ON, based on the acceleration flag data stored in the memory. When the result of the determination in step S31 negative (i.e., when the acceleration flag is set at OFF), the process in step S32 is executed. When the result of the determination in step S31 is positive (i.e., when the acceleration flag is set at ON), the process in step S33 described later is executed.

In step S32, the processing section 21 performs automatic control for the object 31. That is, the processing section 21 calculates a post-movement position of the object 31, by controlling movement of the object 31 in accordance with an algorism that is predetermined in a program of a game application stored in the storage section 12. The processing section 21 stores, in the memory, object position data indicating the calculated post-movement position. Next to step S32, the process in step S36 described later is executed.

On the other hand, in step S33, the processing section 21 performs automatic control for the object 31 in the accelerated state. Also in step S33, as in step S32, the processing section 21 calculates a post-movement position of the object 31, by controlling movement of the object 31 in accordance with an algorism that is predetermined in the program of the game application. However, in step S33, the post-movement position of the object 31 is calculated such that the object 31 moves at a speed higher than a movement speed set in step S32. The processing section 21 stores, in the memory, object position data indicating the calculated post-movement position. Next to step S33, the process in step S34 is executed.

In step S34, the processing section 21 determines whether or not the aforementioned time period T4 has passed from start of the movement control for the object 31 in the accelerated state (in other words, from when a touch-off is performed). When the result of the determination in step S34 is positive, the process in step S35 is executed. When the result of the determination in step S34 is negative, the process in step S35 is skipped, and the process in step S36 described later is executed.

In step S35, the processing section 21 sets the acceleration flag to OFF. That is, the processing section 21 stores, in the memory, acceleration flag data indicating that the acceleration flag is OFF. Thus, the object 31 is set (in the normal state and) in the accelerated state. Next to step S35, the process in step S36 is executed.

In step S36, the processing section 21 generates a game image, and causes the display section 24 to display the game image. That is, the processing section 21 generates the game image based on the object position data stored in the memory, and causes the display section 24 to display the generated game image. The game image generated in step S36 represents a game space in which the object 31 is located at a position indicated by the object position data. In the process in step S36, the processing section 21 controls actions of other objects (e.g., other characters and/or items) according to need, and generates a game image representing a game space including these objects. Next to step S36, the process in step S37 is executed.

In step S37, the processing section 21 determines whether or not to end the game. That is, the processing section 21 ends the game when a predetermined game end condition is satisfied (e.g., the object operated by the user crosses a finish line), or when a predetermined game end instruction is made by the user. The processing section 21 determines not to end the game, when the game end condition is not satisfied and no predetermined termination instruction is made by the user. When the result of the determination in step S37 is negative, the process in step S1 is executed. The processing section 21 repeats the series of processes in steps S1 to S37 until determining to end the game in step S37. When the result of the determination in step S37 is positive, the processing section 21 ends the game processing shown in FIGS. 15 and 16.

[4. Function and Effect of Present Embodiment, and Modifications]

According to the above-described embodiment, a game program causes an information processing apparatus (e.g., the terminal device 2) having a pointing device (e.g., the touch panel 23) to execute process steps as follows:

a first process execution step (step S5) of executing a first process on an object in a virtual game space (i.e., a process of causing the object to transition to the drift state) in response to a second input (i.e., a touch input of a second movement operation) which is performed after end of a first input (i.e., a touch input of a tap operation) to the pointing device and within a predetermined first time period (i.e., the time period T2) from the first input;

a reference position setting step (step S6) of setting a reference position based on an input position at which the second input to the pointing device is started; and a first movement process step (step S20) of executing a first movement process for causing the object to move in the virtual game space, based on the reference position and on the input position of the second input which is continuously performed from start of the second input to the pointing device.

According to the above embodiment, the user can execute the two types of processes, i.e., the first process and the first movement process, on the object by a set of input operations including the first input and the second input (which can be referred to as "continuous input operations" although the inputs are not continuous in a strict sense). Therefore, the information processing apparatus allows the user to perform various operations by a simple input method. Specifically, according to the above embodiment, the user is allowed to perform multiple types of operations on the object by a set of touch inputs that can be performed with one finger of the user.

The "input which is continuously performed from start of the input to the pointing device" is not required to be an input being continued in a strict sense. For example, as for the aforementioned "continuous touch input", a situation can be considered in which, although a touch input is actually performed on the touch panel 23, the touch input is not temporarily detected for a predetermined time period due to erroneous detection. In this case, the terminal device 2 may deal with a touch input detected before the predetermined time period and a touch input detected after the predetermined time period, collectively, as a single continuous touch input. Specifically, when a time period from when a certain touch input has become undetected to when a next touch input is detected is shorter than a predetermined time length, the terminal device 2 may deal with the certain touch input and the next touch input collectively as a single continuous touch input.

Furthermore, according to the above embodiment, the game program causes a computer of an information processing apparatus to execute process steps as follows:

a second reference position setting step (step S10) of setting a reference position, based on an input position regarding a third input to the pointing device (i.e., a touch input of a first movement operation), the third input being different from the second input; and a third process execution step (step S19) of executing a third process on a first object, the third process being different from the first movement process, based on the reference position and on the input position of the third input which is continuously performed from start of the third input.

Therefore, according to the above embodiment, the user can perform an operation on the object by the third input different from the second input. Thus, the information processing apparatus can allow the user to perform more various operations. The third input may be the same as the first input. In other words, the terminal device 2 may deal with the third input as a touch input of the first movement operation, and as a first input to be a condition for a second input (refer to the section of (Modification regarding first input) described later). In addition, the third input may be different from the first input. In other words, the terminal device 2 may not deal with the third input as a first input to be a condition for a second input.

In another embodiment, an object to be subjected to the first movement process and an object to be subjected to the third process may be different objects. In addition, the third process is not limited to the process of causing the object to move, and may be a process of causing the object to perform a predetermined action. For example, in the other embodiment, the object to be subjected to the first movement process may be an object of a character having a bow, and the object to be subjected to the third process may be an object of an arrow to be shot from the bow. At this time, the information processing apparatus may cause the character to move by the first movement process, and may execute, by the third process, a process of causing the character to draw the bow and shoot the arrow (in other words, a process of causing the arrow to move). At this time, for example, the user performs an operation to draw the bow by shifting the input position from the reference position, and performs an operation to shoot the arrow by ending the touch input.

In the above embodiment, a process of causing the object (the same object as in the first movement process) to move by a control method different from that for the first movement process is executed as the third process. Therefore, according to the above embodiment, the user can perform the movement operation for the object by the second input performed after the first input, and can cause the object to move by the third input, using a control method different from that for the movement operation by the second input. Thus, the user can properly use the two types of movement operations by the simple method that depends on whether or not to perform the first input, whereby operabilities of the movement operations can be improved. Furthermore, according to the above embodiment, the two types of movement operations are distinguished from each other by the simple operation that is the first input (more specifically, the tap operation). Therefore, the information processing apparatus can reduce a risk that the user performs an unintended movement operation of the two types of movement operations by mistake. In addition, the user can quickly perform the movement operation by the second input.

(Modification Regarding First Input)

In the above embodiment, the first input to be a condition for the second input (i.e., the second movement operation) is a touch input for the tap operation. In another embodiment, the first input may be a touch input for the first movement operation.

Figure 17:
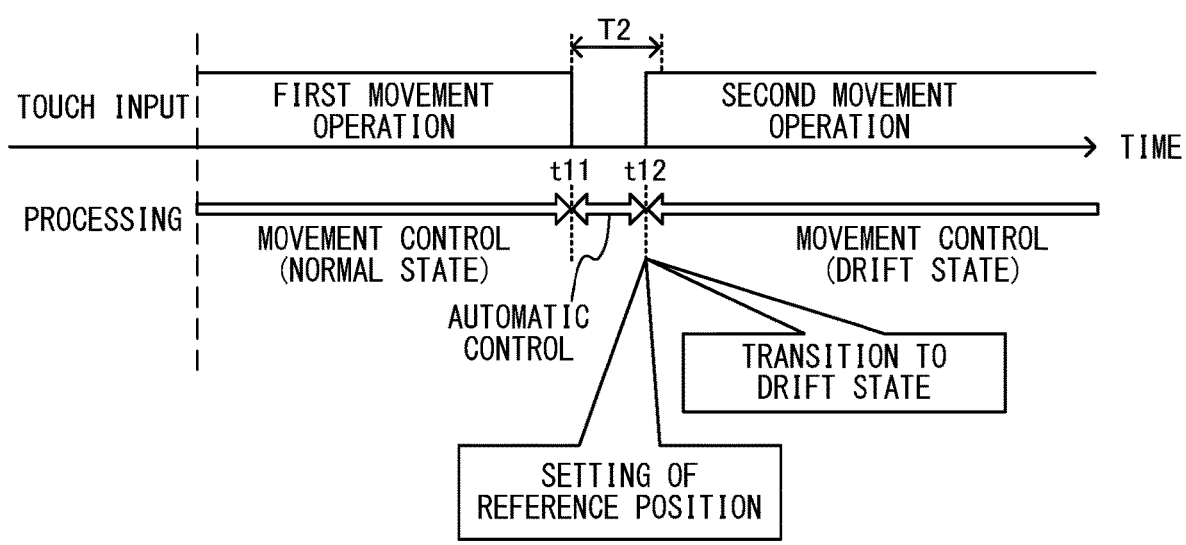
FIG. 17 shows an example of an operation in which the second movement operation is performed subsequently to the first movement operation.

FIG. 17 shows an example of an operation of performing the second movement operation subsequently to the first movement operation. In the example of FIG. 17, at timing t11, a touch input for the first movement operation is ended, and a next touch input is started at timing t12 within a time period T2 from the timing t11. At this time, the terminal device 2 may determine that the operation by the next touch input is the second movement operation, in response to the start of the next touch input. That is, the terminal device 2 may execute a reference position setting process and a transition process to the drift state in response to the start of the next touch input, to start movement control for the object in the drift state.

Thus, in the other embodiment, the first input to be a condition for the second input may be a touch input of the first movement operation. That is, the terminal device 2 may deal with the aforementioned third input (i.e., an input for the first movement operation) as the first input (i.e., an input to be a condition for the second input). In another embodiment, both the touch input of the tap operation and the touch input of the first movement operation may be used as the first input, or only the touch input of the first movement operation may be used as the first input. Furthermore, in another embodiment, the terminal device 2 may not distinguish the tap operation and the first movement operation from each other. That is, the terminal device 2 may determine an input which is started after the time period T2 or more has passed from the timing of a touch-off of a previously performed input (in other words, an input that is not the second input) to be an input for the first movement operation, regardless of the length of the input time period from the touch-on to the touch-off (Modification Regarding Game Content)

In another embodiment, the content of the game executed in the terminal device 2 is not limited to racing, and a game of any content may be executed. For example, in the other embodiment, the game executed in the terminal device 2 may be a game in which an object (i.e., a player character) in a shooting game is operated by an input to the pointing device. At this time, the terminal device 2 can apply the respective movement operations and the tap operation to a process of causing the object to perform actions regarding shooting. Specifically, the terminal device 2 causes a sight to move in response to the first movement operation, and causes a bullet to be shot in response to a touch-off of the first movement operation. Alternatively, the terminal device 2 causes the object to start an action of charging power in response to the tap operation, causes a sight to move in response to the second movement operation performed subsequently to the tap operation, and causes a bullet to be shot in response to a touch-off of the second movement operation. According to this game example, in the operation of causing the object to perform a shooting action, the user can determine whether or not to shoot a bullet after charging power, depending on whether or not the tap operation is performed.

For the purpose of, for example, achieving various game operations by using a pointing device, it is possible to use the above embodiment as a game program, a game apparatus, and the like.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. A non-transitory computer-readable storage medium storing a game program executable on a computer of an information processing device, the game program, when executed by the computer, causing the computer to perform operations comprising:
   repeatedly acquiring input positions detected by a pointing device;
   setting a first reference position, based on an input position at which a first movement operation input to the pointing device is started;
   causing an object to move in a virtual game space by a first movement process, based on the first reference position and on an input position of an input which is continuously performed from a start of the first movement operation input;
   setting a second reference position, based on an input position at which a second movement operation input different from the first movement operation input is started, the second movement operation input being performed after an end of a predetermined input to the pointing device and within a first time period from the predetermined input; and
   causing the object to move in the virtual game space by a second movement process different from the first movement process, based on the second reference position and on an input position of an input which is continuously performed from a start of the second movement operation input, wherein:
   the second movement process is executed at least on a condition that a distance between the position at which the predetermined input is performed and the position at which the second movement operation input is performed is equal to or less than a predetermined value, in the first movement process, a movement direction of the object is changed in the virtual game space, based on a distance between the first reference position and the input position, in the second movement process, the movement direction of the object is changed in the virtual game space, based on a distance between the second reference position and the input position, and when the distance between the first reference position and the input position is equal to the distance between the second reference position and the input position, an amount of change in the movement direction of the object in the second movement process is greater than an amount of change in the movement direction of the object in the first movement process.

2. The non-transitory computer-readable storage medium according to claim 1, wherein the second movement process is executed at least on a condition that a time period from a timing based on a start or an end of the predetermined input to a timing at which the second movement operation input is started is within the first time period.

3. The non-transitory computer-readable storage medium according to claim 1, wherein the game program further causes the computer to execute a predetermined process on the object, in a case where the input which is continuously performed from the start of the second movement operation input satisfies a predetermined condition.

4. A non-transitory computer-readable storage medium storing a game program executable on a computer of an information processing device, the game program, when executed by the computer, causing the computer to perform operations comprising:

repeatedly acquiring input positions detected by a pointing device;

setting a first reference position, based on an input position at which a first movement operation input to the pointing device is started;

causing an object to move in a virtual game space by a first movement process, based on the first reference position and on an input position of an input which is continuously performed from a start of the first movement operation input;

setting a second reference position, based on an input position at which a second movement operation input different from the first movement operation input is started, the second movement operation input being performed after an end of a predetermined input to the pointing device and within a first time period from the predetermined input; and causing the object to move in the virtual game space by a second movement process different from the first movement process, based on the second reference position and on an input position of an input which is continuously performed from a start of the second movement operation input, wherein:

the second movement process is executed at least on a condition that a distance between the position at which the predetermined input is performed and the position at which the second movement operation input is performed is equal to or less than a predetermined value, a determination is made as to whether an input time period from a start to an end of an input, to the pointing device, which is different from the second movement operation input, is within a predetermined second time period, an input whose input time period is determined to be within the predetermined second time period is regarded as the predetermined input, and the second movement process is executed in response to the second movement operation input performed after the predetermined input, and the first movement process is executed, with an input whose input time period is determined not to be within the predetermined second time period being regarded as the first movement operation input.

5. The non-transitory computer-readable storage medium according to claim 4, wherein:

in the first movement process, a movement direction of the object is changed in the virtual game space, based on a distance between the first reference position and the input position, in the second movement process, the movement direction of the object is changed in the virtual game space, based on a distance between the second reference position and the input position, and when the distance between the first reference position and the input position is equal to the distance between the second reference position and the input position, an amount of change in the movement direction of the object in the first movement process is different from an amount of change in the movement direction of the object in the second movement process.

6. The non-transitory computer-readable storage medium according to claim 4, wherein the second movement process is executed at least on a condition that a time period from a timing based on a start or an end of the predetermined input to a timing at which the second movement operation input is started is within the first time period.

7. The non-transitory computer-readable storage medium according to claim 4, wherein the game program further causes the computer to execute a predetermined process on the object, in a case where the input which is continuously performed from the start of the second movement operation input satisfies a predetermined condition.

8. An information processing apparatus comprising:

a memory configured to store instructions; and one or more processors in communication with the memory, wherein the instructions, when executed, configure the one or more processors to at least:

repeatedly acquire input positions detected by a pointing device;

set a first reference position, based on an input position at which a first movement operation input to the pointing device is started;

cause an object to move in a virtual game space by a first movement process, based on the first reference position and on an input position of an input which is continuously performed from a start of the first movement operation input;

set a second reference position, based on an input position at which a second movement operation input different from the first movement operation input is started, the second movement operation input being performed after an end of a predetermined input to the pointing device and within a first time period from the predetermined input; and cause the object to move in the virtual game space by a second movement process different from the first movement process, based on the second reference position and on an input position of an input which is continuously performed from a start of the second movement operation input, wherein:

in the first movement process, a movement direction of the object is changed in the virtual game space, based on a distance between the first reference position and the input position, in the second movement process, the movement direction of the object is changed in the virtual game space, based on a distance between the second reference position and the input position, and when the distance between the first reference position and the input position is equal to the distance between the second reference position and the input position, an amount of change in the movement direction of the object in the second movement process is greater than an amount of change in the movement direction of the object in the first movement process.

9. The information processing apparatus according to claim 8, wherein the second movement process is executed at least on a condition that a time period from a timing based on a start or an end of the predetermined input to a timing at which the second movement operation input is started is within the first time period.

10. The information processing apparatus according to claim 8, wherein a predetermined process is executed on the object, in a case where the input which is continuously performed from the start of the second movement operation input satisfies a predetermined condition.

11. An information processing system comprising:
a memory configured to store instructions; and
one or more processors in communication with the memory, wherein the instructions, when executed, configure the one or more processors to at least:
repeatedly acquire input positions detected by a pointing device;
set a first reference position, based on an input position at which a first movement operation input to the pointing device is started;
cause an object to move in a virtual game space by a first movement process, based on the first reference position and on an input position of an input which is continuously performed from a start of the first movement operation input;
set a second reference position, based on an input position at which a second movement operation input different from the first movement operation input is started, the second movement operation input being performed after an end of a predetermined input to the pointing device and within a first time period from the predetermined input; and
cause the object to move in the virtual game space by a second movement process different from the first movement process, based on the second reference position and on an input position of an input which is continuously performed from a start of the second movement operation input, wherein:
in the first movement process, a movement direction of the object is changed in the virtual game space, based on a distance between the first reference position and the input position,
in the second movement process, the movement direction of the object is changed in the virtual game space, based on a distance between the second reference position and the input position, and
when the distance between the first reference position and the input position is equal to the distance between the second reference position and the input position, an amount of change in the movement direction of the object in the second movement process is greater than an amount of change in the movement direction of the object in the first movement process.

12. The information processing system according to claim 11, wherein the second movement process is executed at least on a condition that a time period from a timing based on a start or an end of the predetermined input to a timing at which the second movement operation input is started is within the first time period.

13. The information processing system according to claim 11, wherein a predetermined process is executed on the object, in a case where the input which is continuously performed from the start of the second movement operation input satisfies a predetermined condition.

14. A game processing method executed in an information processing system, the method comprising:
repeatedly acquiring input positions detected by a pointing device;
setting a first reference position, based on an input position at which a first movement operation input to the pointing device is started;
causing an object to move in a virtual game space by a first movement process, based on the first reference position and on an input position of an input which is continuously performed from a start of the first movement operation input;
setting a second reference position, based on an input position at which a second movement operation input different from the first movement operation input is started, the second movement operation input being performed after an end of a predetermined input to the pointing device and within a first time period from the predetermined input; and
causing the object to move in the virtual game space by a second movement process different from the first movement process, based on the second reference position and on an input position of an input which is continuously performed from a start of the second movement operation input, wherein:
in the first movement process, a movement direction of the object is changed in the virtual game space, based on a distance between the first reference position and the input position,
in the second movement process, the movement direction of the object is changed in the virtual game space, based on a distance between the second reference position and the input position, and
when the distance between the first reference position and the input position is equal to the distance between the second reference position and the input position, an amount of change in the movement direction of the object in the second movement process is greater than an amount of change in the movement direction of the object in the first movement process.

15. The game processing method according to claim 14, wherein the second movement process is executed at least on a condition that a time period from a timing based on a start or an end of the predetermined input to a timing at which the second movement operation input is started is within the first time period.

16. The game processing method according to claim 14, wherein a predetermined process is executed on the object, in a case where the input which is continuously performed from the start of the second movement operation input satisfies a predetermined condition.

17. An information processing apparatus comprising:
a memory configured to store instructions; and one or more processors in communication with the memory, wherein the instructions, when executed, configure the one or more processors to at least:
- repeatedly acquire input positions detected by a pointing device;
- set a first reference position, based on an input position at which a first movement operation input to the pointing device is started;
- cause an object to move in a virtual game space by a first movement process, based on the first reference position and on an input position of an input which is continuously performed from a start of the first movement operation input;
- set a second reference position, based on an input position at which a second movement operation input different from the first movement operation input is started, the second movement operation input being performed after an end of a predetermined input to the pointing device and within a first time period from the predetermined input; and
- cause the object to move in the virtual game space by a second movement process different from the first movement process, based on the second reference position and on an input position of an input which is continuously performed from a start of the second movement operation input, wherein:

the second movement process is executed at least on a condition that a distance between the position at which the predetermined input is performed and the position at which the second movement operation input is performed is equal to or less than a predetermined value, a determination is made as to whether an input time period from a start to an end of an input, to the pointing device, which is different from the second movement operation input, is within a predetermined second time period, an input whose input time period is determined to be within the predetermined second time period is regarded as the predetermined input, and the second movement process is executed in response to the second movement operation input performed after the predetermined input, and the first movement process is executed, with an input whose input time period is determined not to be within the predetermined second time period being regarded as the first movement operation input.

18. An information processing system comprising:
a memory configured to store instructions; and
one or more processors in communication with the memory, wherein the instructions, when executed, configure the one or more processors to at least:
- repeatedly acquire input positions detected by a pointing device;
- set a first reference position, based on an input position at which a first movement operation input to the pointing device is started;
- cause an object to move in a virtual game space by a first movement process, based on the first reference position and on an input position of an input which is continuously performed from a start of the first movement operation input;
- set a second reference position, based on an input position at which a second movement operation input different from the first movement operation input is started, the second movement operation input being performed after an end of a predetermined input to the pointing device and within a first time period from the predetermined input; and
- cause the object to move in the virtual game space by a second movement process different from the first movement process, based on the second reference position and on an input position of an input which is continuously performed from a start of the second movement operation input, wherein:

the second movement process is executed at least on a condition that a distance between the position at which the predetermined input is performed and the position at which the second movement operation input is performed is equal to or less than a predetermined value, a determination is made as to whether an input time period from a start to an end of an input, to the pointing device, which is different from the second movement operation input, is within a predetermined second time period, an input whose input time period is determined to be within the predetermined second time period is regarded as the predetermined input, and the second movement process is executed in response to the second movement operation input performed after the predetermined input, and the first movement process is executed, with an input whose input time period is determined not to be within the predetermined second time period being regarded as the first movement operation input.

19. A game processing method executed in an information processing system, the method comprising:
- repeatedly acquiring input positions detected by a pointing device;
- setting a first reference position, based on an input position at which a first movement operation input to the pointing device is started;
- causing an object to move in a virtual game space by a first movement process, based on the first reference position and on an input position of an input which is continuously performed from a start of the first movement operation input;
- setting a second reference position, based on an input position at which a second movement operation input different from the first movement operation input is started, the second movement operation input being performed after an end of a predetermined input to the pointing device and within a first time period from the predetermined input; and
- causing the object to move in the virtual game space by a second movement process different from the first movement process, based on the second reference position and on an input position of an input which is continuously performed from a start of the second movement operation input, wherein:

the second movement process is executed at least on a condition that a distance between the position at which the predetermined input is performed and the position at which the second movement operation input is performed is equal to or less than a predetermined value, a determination is made as to whether an input time period from a start to an end of an input, to the pointing device, which is different from the second movement operation input, is within a predetermined second time period, an input whose input time period is determined to be within the predetermined second time period is regarded as the predetermined input, and the second movement process is executed in response to the second movement operation input performed after the predetermined input, and the first movement process is executed, with an input whose input time period is determined not to be within the predetermined second time period being regarded as the first movement operation input.

\* \* \* \* \*